US011862102B2

(12) United States Patent
Kim et al.

(10) Patent No.: US 11,862,102 B2
(45) Date of Patent: Jan. 2, 2024

(54) DISPLAY DEVICE

(71) Applicant: Samsung Display Co., Ltd., Yongin-si (KR)

(72) Inventors: Jung-Taek Kim, Seoul (KR); Byeong-Doo Kang, Cheonan-si (KR); Jae Woo Ryu, Suwon-si (KR); Joonsuk Baik, Suwon-si (KR); Sekeun Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/883,869

(22) Filed: Aug. 9, 2022

(65) Prior Publication Data

US 2023/0109314 A1 Apr. 6, 2023

(30) Foreign Application Priority Data

Sep. 30, 2021 (KR) ........................ 10-2021-0129758

(51) Int. Cl.
*G09G 3/3266* (2016.01)
*G09G 3/3275* (2016.01)

(52) U.S. Cl.
CPC ......... *G09G 3/3266* (2013.01); *G09G 3/3275* (2013.01); *G09G 2300/0842* (2013.01); *G09G 2310/0278* (2013.01); *G09G 2310/0294* (2013.01); *G09G 2310/061* (2013.01)

(58) Field of Classification Search
CPC ............... G09G 3/3266; G09G 3/3275; G09G 2300/0842; G09G 2310/0278; G09G 2310/0294; G09G 2310/061
See application file for complete search history.

(56) References Cited

U.S. PATENT DOCUMENTS 9,558,717 B2 1/2017 Takasugi et al.
11,030,951 B2 6/2021 Lee et al.
2016/0078813 A1* 3/2016 Mizukoshi ........... G09G 3/3233 438/23

(Continued)

FOREIGN PATENT DOCUMENTS

KR 1020170036569 A 4/2017
KR 1020200076194 A 6/2020

(Continued)

*Primary Examiner* — David Tung

(74) *Attorney, Agent, or Firm* — CANTOR COLBURN LLP

(57) ABSTRACT

In a display device, each of pixels includes a light emitting element and a pixel circuit which is connected to the light emitting element at a first node and drives the light emitting element in response to a corresponding driving scan signal among driving scan signals during a display period. The pixel circuit is connected to a corresponding readout line among readout lines at a second node. The sensing circuit senses a potential of the first node through the corresponding readout line during a blank period, and each of frames includes the display period and the blank period. At least two driving scan signals among the driving scan signals respectively include a plurality of rewriting periods, each of which is activated during the blank period corresponding thereto, and the rewriting periods of the driving scan signals have different durations from each other.

19 Claims, 13 Drawing Sheets

(56) References Cited

U.S. PATENT DOCUMENTS

| | | | | |
|---|---|---|---|---|
| 2016/0189630 | A1* | 6/2016 | Chang | G09G 3/3233<br>345/76 |
| 2018/0061293 | A1* | 3/2018 | Park | G09G 3/006 |
| 2019/0005883 | A1* | 1/2019 | Kim | G09G 3/3233 |
| 2019/0378459 | A1* | 12/2019 | Kim | G09G 3/3258 |
| 2020/0152123 | A1* | 5/2020 | Kim | G09G 3/3291 |
| 2021/0134215 | A1* | 5/2021 | Chun | G09G 3/3233 |
| 2021/0159295 | A1* | 5/2021 | Miao | H10K 59/1216 |

FOREIGN PATENT DOCUMENTS

| | | | |
|---|---|---|---|
| KR | 102168014 | B1 | 10/2020 |
| KR | 1020210036660 | A | 4/2021 |

* cited by examiner

DISPLAY DEVICE

This application claims priority to Korean Patent Application No. 10-2021-0129758, filed on Sep. 30, 2021, and all the benefits accruing therefrom under 35 U.S.C. § 119, the content of which in its entirety is herein incorporated by reference.

BACKGROUND

1. Field

The disclosure herein relates to a display device. More particularly, the disclosure herein relates to a display device with improved display quality.

2. Description of the Related Art

A light emitting display device, among various types of display device, displays an image using a light emitting diode that generates light by recombination of electrons and holes. Such a light emitting display device has desired characteristics such as a fast response speed and low power consumption.

The light emitting display device may include pixels connected to data lines and scan lines. Each of the pixels generally includes a light emitting diode and a circuit unit for controlling the amount of current flowing to the light emitting diode. The circuit unit controls, in response to a data signal, the amount of the current flowing from a first driving voltage to a second driving voltage via the light emitting diode. In this case, light having a predetermined luminance is generated corresponding to the amount of the current flowing through the light emitting diode.

SUMMARY

The disclosure provides a display device capable of preventing dark lines and bright lines from being viewed on a display panel, when a characteristic of a pixel is sensed through a sensing circuit.

An embodiment of the invention provides a display device including: a display panel including a plurality of scan lines, a plurality of pixels, and a plurality of readout lines; a scan driver connected to the plurality of scan lines; and a sensing circuit connected to the plurality of readout lines.

In such an embodiment, each of the plurality of pixels includes a light emitting element and a pixel circuit connected to the light emitting element at a first node, where the pixel circuit drives the light emitting element in response to a corresponding driving scan signal among a plurality of driving scan signals during a display period.

In such an embodiment, the pixel circuit is connected to a corresponding readout line among the plurality of readout lines at a second node.

In such an embodiment, the sensing circuit senses a potential of the first node through the corresponding readout line during a blank period, and each of a plurality of frames may include the display period and the blank period.

In such an embodiment, the plurality of driving scan signals respectively comprise a plurality of rewriting periods, at least one rewriting period of at least one driving scan signal among the plurality of driving scan signals is activated during the blank period, and the plurality of rewriting periods of the plurality of driving scan signals may have different durations from each other.

An embodiment of the invention provides a display device including: a display panel including a plurality of pixels and a plurality of readout lines; and a sensing circuit connected to the plurality of readout lines.

In such an embodiment, each of the plurality of pixels includes a light emitting element and a pixel circuit connected to the light emitting element at a first node, where the pixel circuit drives the light emitting element during a display period of a frame.

In such an embodiment, the pixel circuit is connected to a corresponding readout line among the plurality of readout lines at a second node.

In such an embodiment, the sensing circuit includes a sampling circuit unit which samples a potential of the first node in response to a sampling control signal, a first initialization circuit unit which initializes a potential of the second node in response to a first initialization control signal, and a second initialization circuit unit which initializes the potential of the second node in response to a second initialization control signal.

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1:
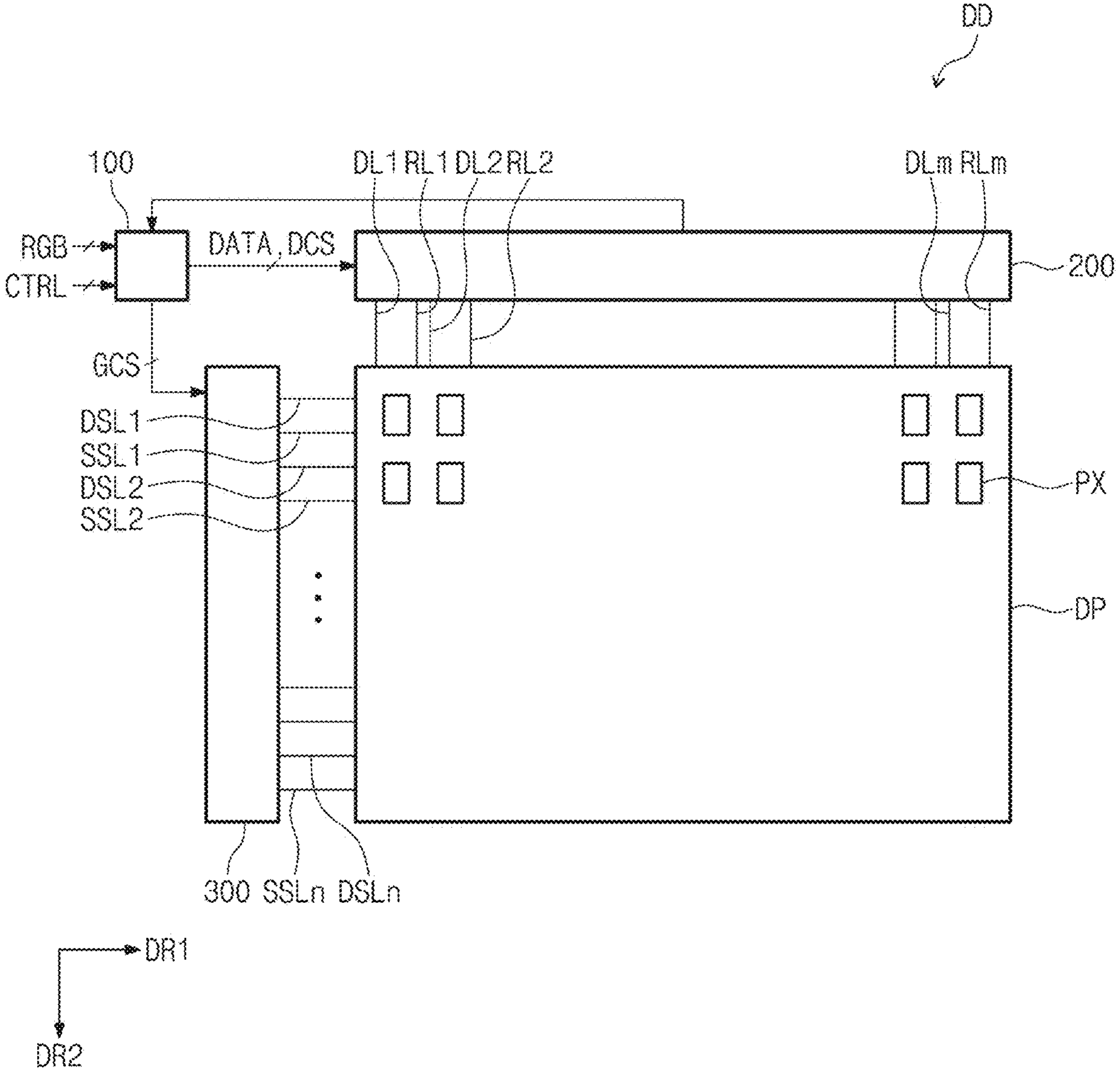
FIG. 1 is a block diagram of a display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element or layer (or region, portion, and the like) is referred to as being "on", "connected to", or "coupled to" another element or layer, it can be directly on, connected to, or coupled to the other element or layer, or intervening elements or layers may be present. In contrast, when an element is referred to as being "directly on" another element, there are no intervening elements present.

Like reference numerals refer to like elements throughout. In the figures, the thicknesses, ratios, and dimensions of elements are exaggerated for effective description of the technical contents. "Or" means "and/or." As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the invention. As used herein, the singular forms, "a", "an", and "the" are intended to include the plural forms as well, unless the context clearly indicates otherwise. For example, "an element" has the same meaning as "at least one element," unless the context clearly indicates otherwise. "At least one" is not to be construed as limiting "a" or "an."

Spatially relative terms, such as "beneath", "below", "lower", "above", and "upper", may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

It will be further understood that the terms "comprises" and/or "comprising," or "includes" and/or "including", when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having meaning that is consistent with their meaning in the context of the relevant art and should not be interpreted in an overly idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 2:
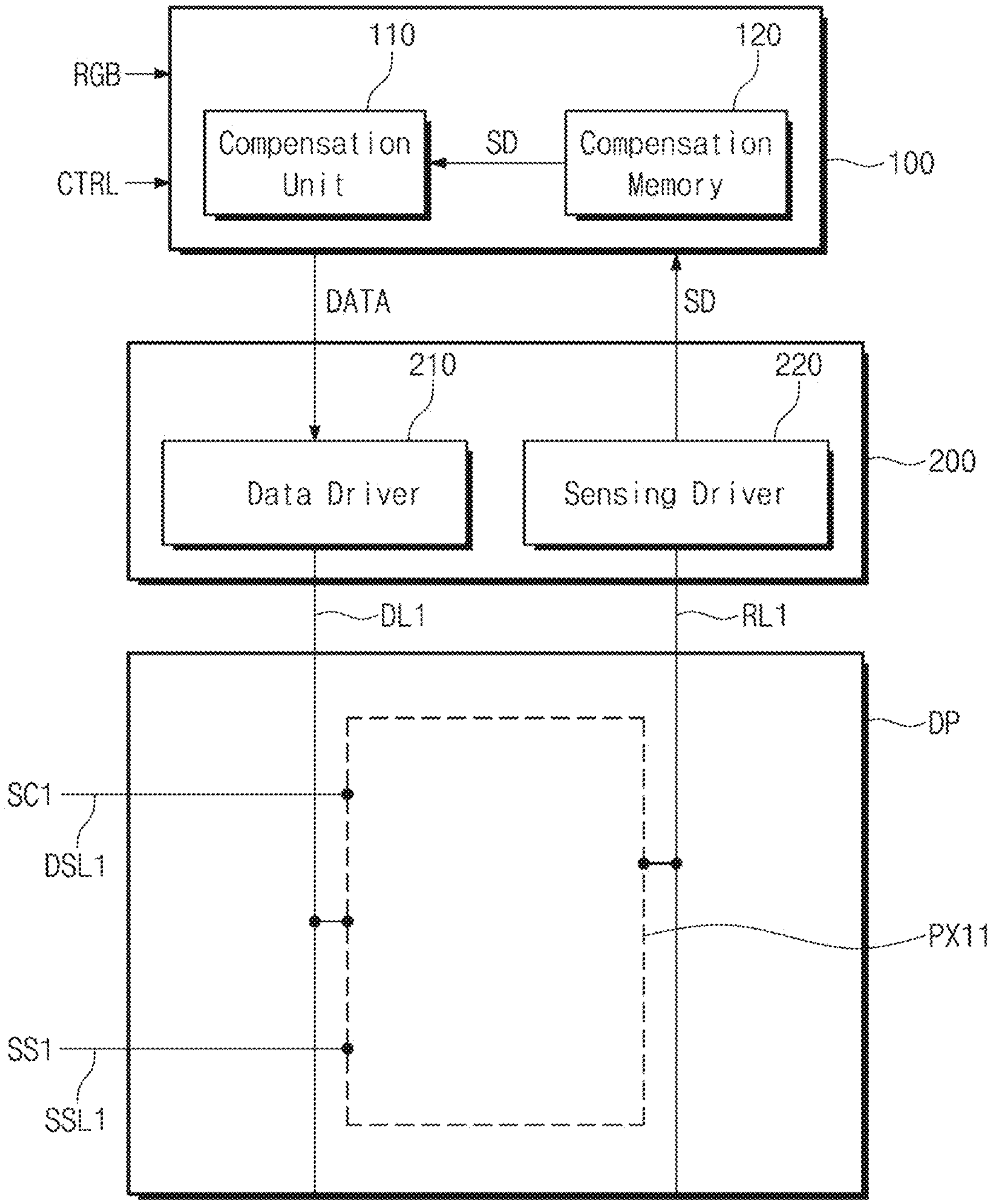
FIG. 2 is a block diagram illustrating the controller and the source driver illustrated in FIG. 1.

FIG. 1 is a block diagram of a display device according to an embodiment of the invention, and FIG. 2 is a block diagram illustrating the controller and the source driver illustrated in FIG. 1.

Referring to FIG. 1 and FIG. 2, an embodiment of a display device DD according to the invention may be a device that is activated based on an electrical signal to display an image. The display device DD may be applied to an electronic device such as a smart watch, a tablet, a laptop computer, a computer, or a smart television.

The display device DD may include a display panel DP, a controller 100, a source driver 200, and a scan driver 300. In an embodiment of the invention, the source driver 200 may include a data driver 210 and a sensing circuit (or a sensing driver) 220.

The display panel DP includes a plurality of driving scan lines DSL1 to DSLn, a plurality of sensing scan lines SSL1 to SSLn, a plurality of data lines DL1 to DLm, a plurality of readout lines RL1 to RLm, and a plurality of pixels PX. The driving scan lines DSL1 to DSLn may each extend in a first direction DR1 and may be arranged in a second direction DR2. The sensing scan lines SSL1 to SSLn may each extend in the first direction DR1 and may be arranged in the second direction DR2. The second direction DR2 may be a direction crossing the first direction DR1. The data lines DL1 to DLm may each extend in the second direction DR2 and may be arranged in the first direction DR1, and the readout lines RL1 to RLm may each extend in the second direction DR2 and may be arranged in the first direction DR1.

Each of the plurality of pixels PX is electrically connected to a corresponding one of the driving scan lines DSL1 to DSLn, a corresponding one of the sensing scan lines SSL1 to SSLn, a corresponding one of the data lines DL1 to DLm, and a corresponding one of the readout lines RL1 to RLm. Each of the plurality of pixels PX may be electrically connected to two scan lines. In an embodiment, for example, as illustrated in FIG. 2, a first pixel PX11 of the plurality of pixels PX may be connected to a first driving scan line DSL1, a first sensing scan line SSL1, a first data line DL1, and a first readout line RL1.

Each of the plurality of pixels PX may include a light emitting element ED (see FIG. 6A) and a pixel driving circuit (or a pixel circuit) PXC (see FIG. 6A) for controlling light emission of the light emitting element ED. The pixel driving circuit PXC may include a plurality of transistors and a capacitor.

The controller 100 receives an image signal RGB and a control signal CTRL. The controller 100 generates an image data signal DATA obtained by converting the data format of the image signal RGB based on (or to correspond to) the interface specification between the controller 100 and the source driver 200. The controller 100 outputs a scan control signal GCS and a source control signal DCS. The source control signal DCS may include a data control signal DCS1 for controlling the driving of the data driver 210 and a sensing control signal DCS2 for controlling the driving of the sensing circuit 220.

The data driver 210 receives the data control signal DCS1 and the image data signal DATA from the controller 100. The data driver 210 converts the image data signal DATA into data signals and outputs the data signals to the plurality of data lines DL1 to DLm. The data signals may be analog voltages corresponding to the gradation (or grayscale) values of the image data signal DATA.

The sensing circuit 220 receives the sensing control signal DCS2 from the controller 100. The sensing circuit 220 may sense the display panel DP in response to the sensing control signal DCS2. The sensing circuit 220 may sense characteristics of elements included in each of the pixels PX of the display panel DP from the plurality of readout lines RL1 to RLm.

In an embodiment of the invention, the source driver 200 may be formed in the form of or defined by at least one chip. In an embodiment, for example, where the source driver 200 is formed as a single chip, the data driver 210 and the sensing circuit 220 may be embedded in the chip. Each of the data driver 210 and the sensing circuit 220 may be provided in plural. In an embodiment, where the source driver 200 is formed of a plurality of chips, each of the data drivers 210 and each of the sensing circuits 220 may be embedded in a corresponding one of the plurality of chips.

Although an embodiment may have a structure in which the data driver 210 and the sensing circuit 220 are embedded in the source driver 200, an embodiment of the invention is not limited thereto. In an alternative embodiment, for example, the data driver 210 and the sensing circuit 220 may be formed in the form of separate chips.

In an embodiment, as show in FIG. 2, the controller 100 includes a compensation memory 120 that stores sensing data SD for data compensation and a compensation unit 110 that compensates the image data signal DATA based on the sensing data SD. The compensation memory 120 may receive and store the sensing data SD sensed through the sensing circuit 220. The compensation unit 110 may read the sensing data SD stored in the compensation memory 120 and may compensate the image data signal DATA based on the read sensing data SD.

The controller 100 may drive the sensing circuit 220 in a period (e.g., a power-on period) in which power is applied to the display device DD, or in a certain period (e.g., a blank period) of each of frames in which the display device DD displays an image.

The elements such as the light emitting element ED and the transistors included in each of the pixels PX may deteriorate in proportion to the driving time, and characteristics (e.g., a threshold voltage) thereof may be degraded. To compensate therefor, the sensing circuit 220 may sense characteristics of elements included in one or more of the pixels PX and may feed the sensed sensing data SD back to the controller 100. The controller 100 may correct the image data signal DATA to be written in the pixels PX, based on the sensing data SD fed back from the sensing circuit 220.

The scan driver 300 receives the scan control signal GCS from the controller 100. The scan driver 300 may output scan signals in response to the scan control signal GCS. The scan driver 300 may be formed in the form of a chip and mounted on the display panel DP. Alternatively, the scan driver 300 may be embedded in the display panel DP. In an embodiment where the scan driver 300 is embedded in the display panel DP, the scan driver 300 may include transistors formed through a same process as the pixel driving circuit PXC.

The scan driver 300 may generate a plurality of driving scan signals SC1 to SCn (see FIG. 7) and a plurality of sensing scan signals SS1 to SSn (see FIG. 7) in response to the scan control signal GCS. The plurality of driving scan signals SC1 to SCn are respectively applied to the driving scan lines DSL1 to DSLn, and the plurality of sensing scan signals SS1 to SSn are respectively applied to the sensing scan lines SSL1 to SSLn.

Figure 3A:
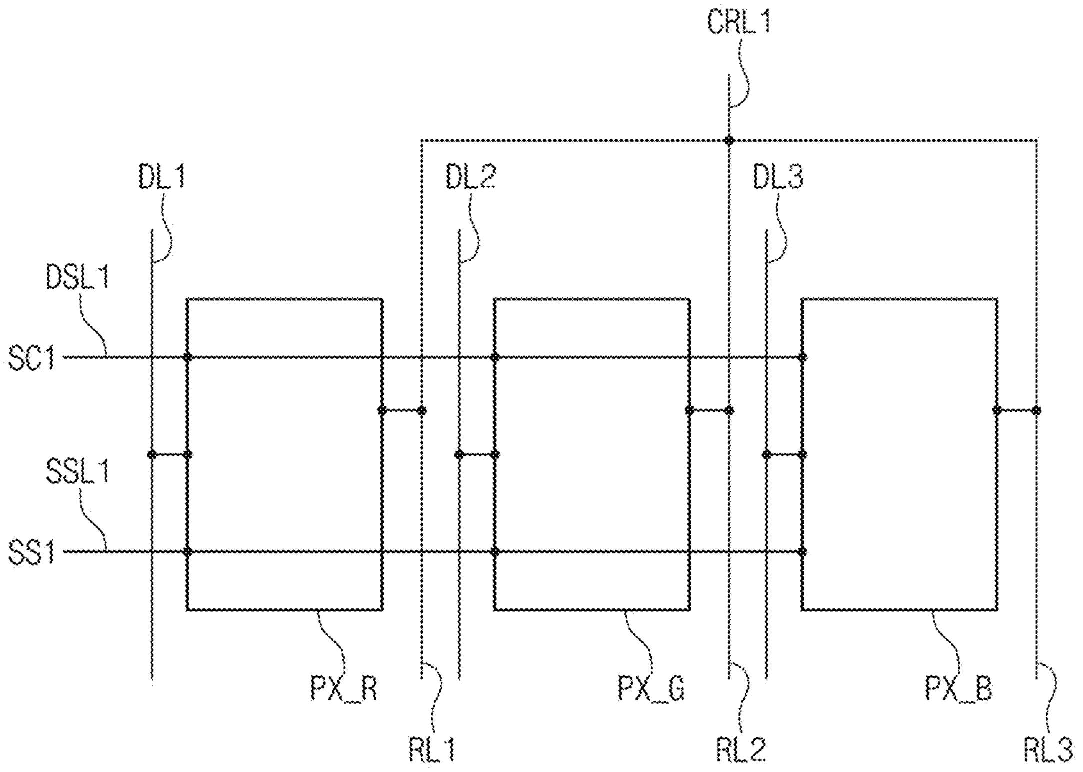
FIG. 3A and FIG. 3B are conceptual diagrams illustrating connection relationships between pixels and readout lines according to embodiments of the invention.
Figure 3B:
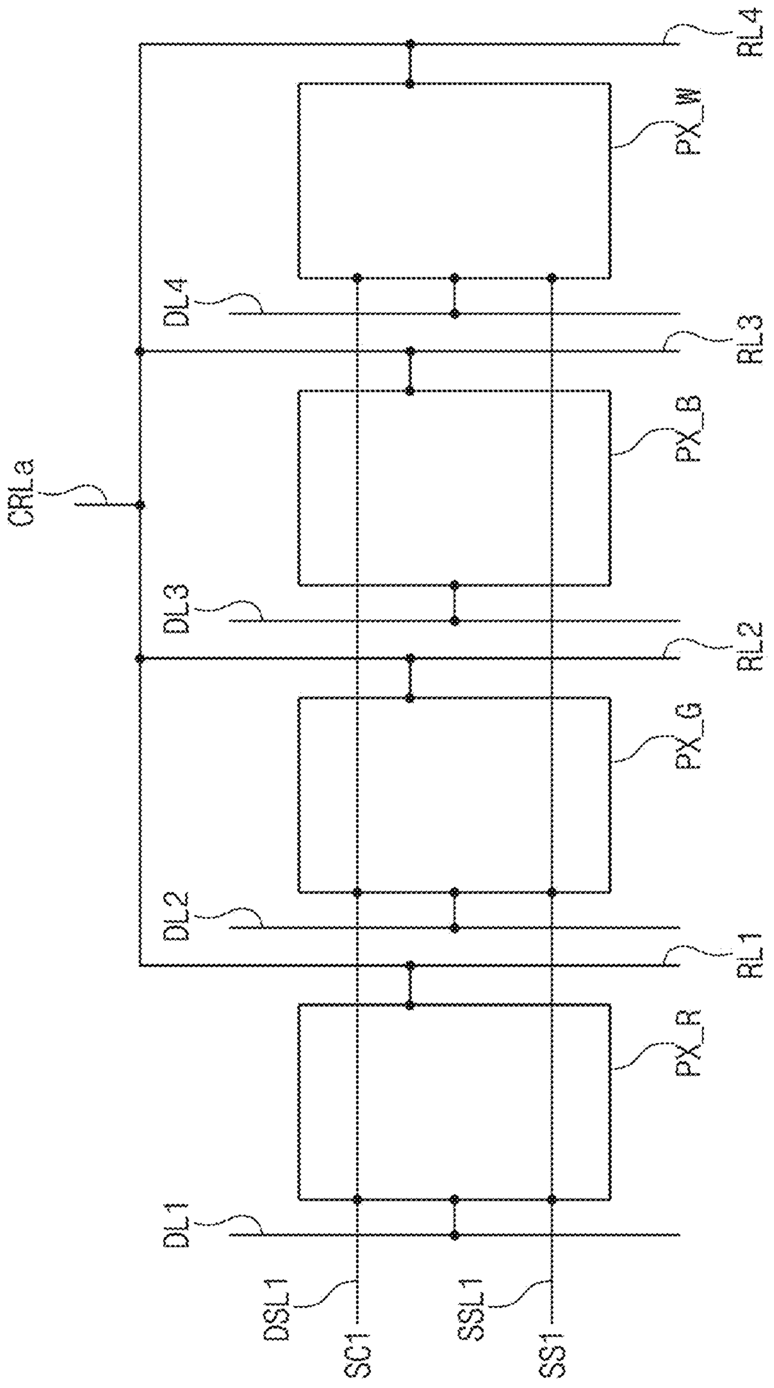

FIG. 3A and FIG. 3B are conceptual diagrams illustrating connection relationships between pixels and readout lines according to embodiments of the invention.

Referring to FIGS. 1, 2, and 3A, in an embodiment, the plurality of pixels PX may include a plurality of red pixels, a plurality of green pixels, and a plurality of blue pixels. A first red pixel PX_R of the plurality of red pixels is connected to the first data line DL1 and the first readout line RL1. A first green pixel PX_G of the plurality of green pixels is connected to a second data line DL2 and a second readout line RL2. A first blue pixel PX_B of the plurality of blue pixels is connected to a third data line DL3 and a third readout line RL3. In an embodiment of the invention, the first to third readout lines RL1 to RL3 may be electrically connected to a common readout line CRL1.

In an embodiment where the first to third readout lines RL1 to RL3 are electrically connected to each other through the common readout line CRL1, the sensing circuit 220 may simultaneously sense the characteristics of elements respectively included in the first red pixel PX_R, the first green pixel PX_G, and the first blue pixel PX_B. The first pixel PX11 illustrated in FIG. 2 may be one of the first red pixel PX_R, the first green pixel PX_G, and the first blue pixel PX_B.

Although FIG. 3A exemplarily illustrates an embodiment where the first to third readout lines RL1 to RL3 are electrically connected to each other, an embodiment of the invention is not limited thereto. Alternatively, two adjacent readout lines among the plurality of readout lines RL1 to RLm may be electrically connected to each other, or four adjacent readout lines among the plurality of readout lines RL1 to RLm may be electrically connected to each other.

The first red pixel PX_R, the first green pixel PX_G, and the first blue pixel PX_B may be connected to the first driving scan line DSL1 among the plurality of driving scan lines DSL1 to DSLn and the first sensing scan line SSL1 among the plurality of sensing scan lines SSL1 to SSLn. The first red pixel PX_R, the first green pixel PX_G, and the first blue pixel PX_B receive a first driving scan signal SC1 through the first driving scan line DSL1 and receive a first sensing scan signal SS1 through the first sensing scan line SSL1. An operation of each of the pixels PX will be described in detail later with reference to FIGS. 6A to 12B.

Referring to FIGS. 1, 2, and 3B, in an embodiment, a plurality of pixels PX may include a plurality of red pixels, a plurality of green pixels, a plurality of blue pixels, and a plurality of white pixels. A first red pixel PX_R among the plurality of red pixels is connected to a first data line DL1 and a first readout line RL1. A first green pixel PX_G among the plurality of green pixels is connected to a second data line DL2 and a second readout line RL2. A first blue pixel PX_B among the plurality of blue pixels is connected to a third data line DL3 and a third readout line RL3. A first white pixel PX_W among the plurality of white pixels is connected to a fourth data line DL4 and a fourth readout line RL4. In an embodiment of the invention, the first to fourth readout lines RL1 to RL4 may be electrically connected to a common readout line CRLa.

In an embodiment where the first to fourth readout lines RL1 to RL4 are electrically connected to each other through the common readout line CRLa, a sensing circuit 220 may simultaneously sense the characteristics of elements respectively included in the first red pixel PX_R, the first green pixel PX_G, the first blue pixel PX_B, and the first white pixel PX_W. The first pixel PX11 illustrated in FIG. 2 may be one of the first red pixel PX_R, the first green pixel PX_G, the first blue pixel PX_B, and the first white pixel PX_W.

Figure 4:
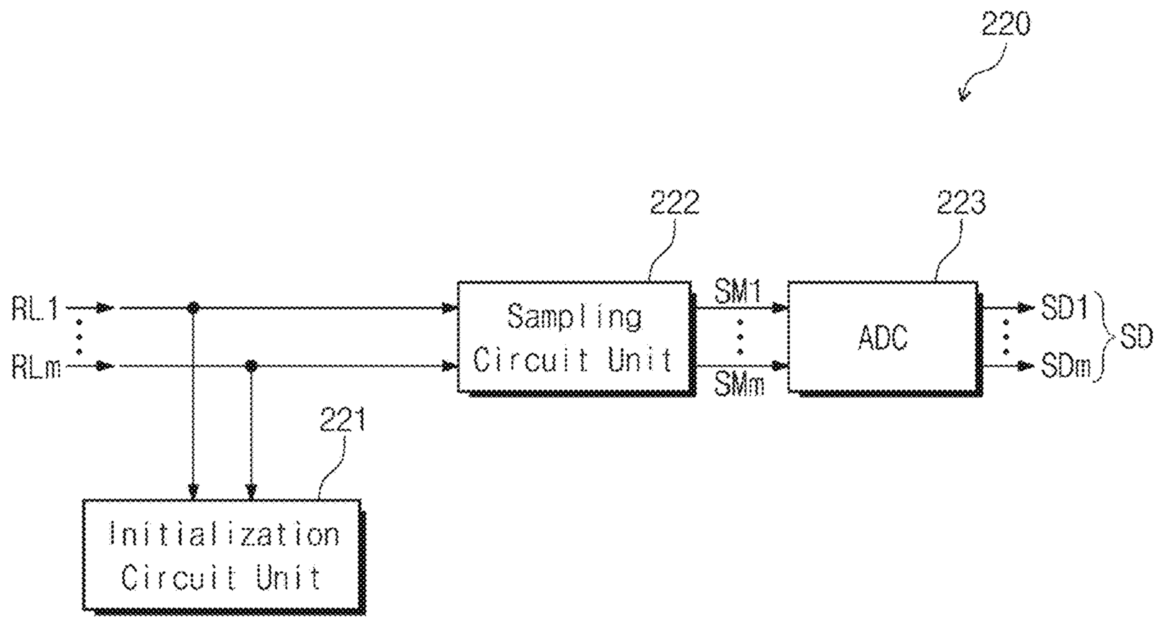
FIG. 4 is a block diagram of the sensing circuit illustrated in FIG. 2.

FIG. 4 is a block diagram of the sensing circuit illustrated in FIG. 2.

Referring to FIG. 4, an embodiment of the sensing circuit 220 according to the invention may include an initialization circuit unit 221, a sampling circuit unit 222, and an analog-to-digital converter ("ADC") 223.

Figure 6A:
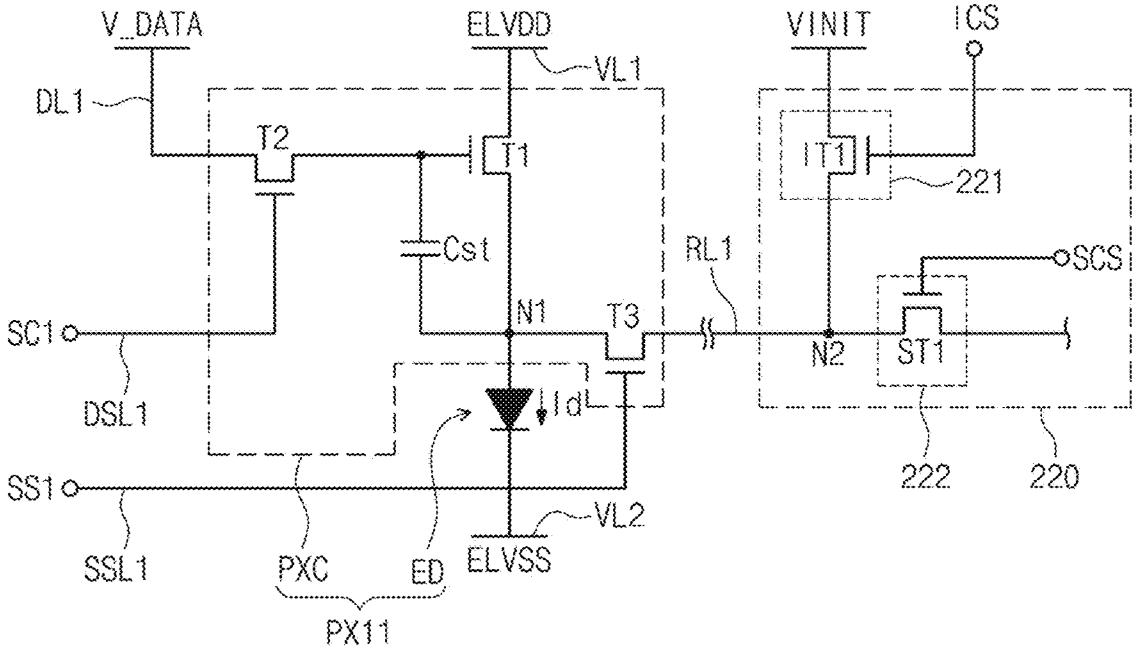
FIG. 6A is a circuit diagram illustrating one of pixels and a sensing circuit according to an embodiment of the invention.

The initialization circuit unit 221 may be electrically connected to the readout lines RL1 to RLm and may initialize the readout lines RL1 to RLm in response to an initialization control signal ICS (see FIG. 6A). The sampling circuit unit 222 may be electrically connected to the readout lines RL1 to RLm and may sample sensing signals respectively outputted from the readout lines RL1 to RLm in response to a sampling control signal SCS (see FIG. 6A). The sampling circuit unit 222 may sample the sensing signals respectively outputted from the readout lines RL1 to RLm during a sampling period and may output the sampled sensing signals as sampled signals SM1 to SMm. The ADC 223 converts the sampled signals SM1 to SMm outputted from the sampling circuit unit 222 into sensing data SD1 to SDm in a digital form and outputs the sensing data SD1 to SDm.

Alternatively, the sensing circuit 220 may further include a scaler disposed between the sampling circuit unit 222 and the ADC 223. The scaler may scale the voltage range of the sampled signals SM1 to SMm outputted from the sampling circuit unit 222 according to the input voltage range of the ADC 223.

Figure 5:
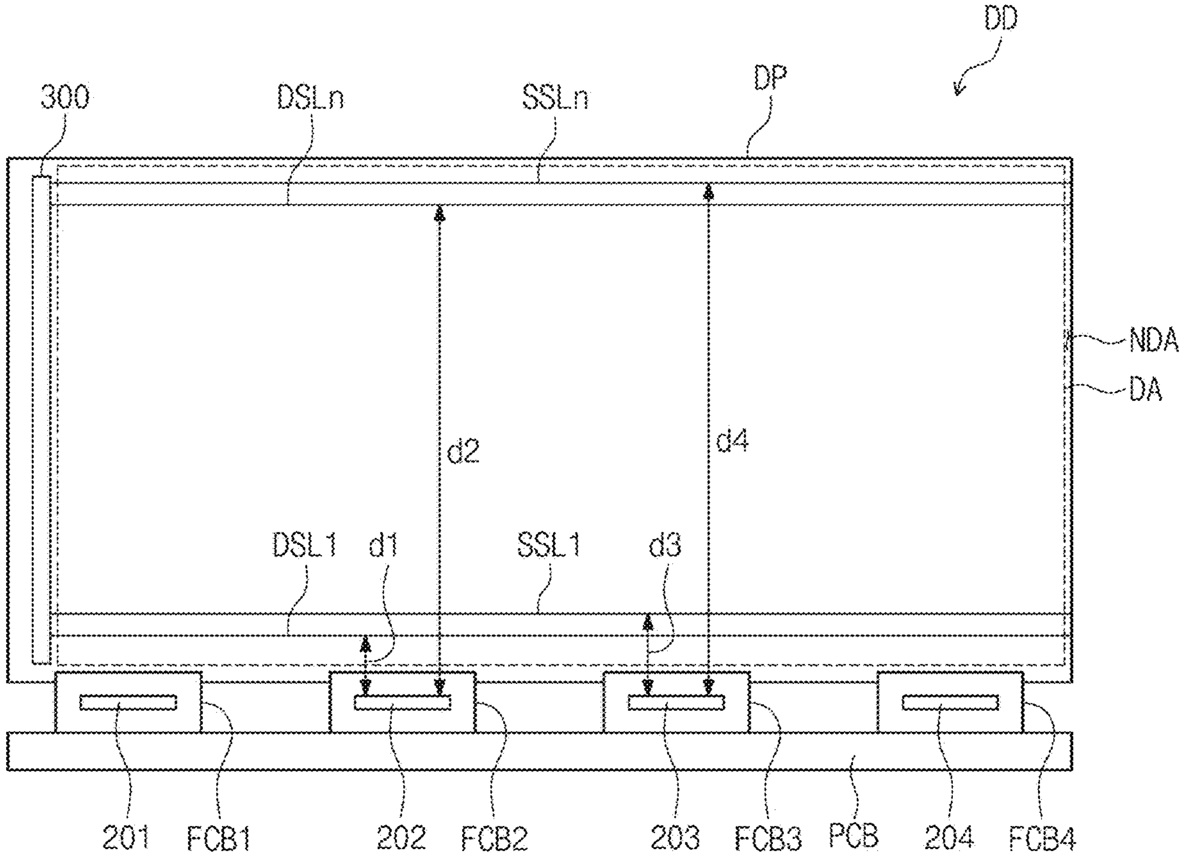
FIG. 5 is a plan view of a display device according to an embodiment of the invention.

FIG. 5 is a plan view of a display device according to an embodiment of the invention.

Referring to FIG. 1 and FIG. 5, an embodiment of the display panel DP includes a display area DA which displays an image and a non-display area NDA adjacent to the display area DA. The display area DA is an area in which an image is substantially displayed, and the non-display area NDA is a bezel area in which an image is not displayed. FIG. 5 illustrates an embodiment having a structure in which the non-display area NDA is disposed to surround the display area DA, but an embodiment of the invention is not limited thereto. In an embodiment, the non-display area NDA may be disposed on at least one side of the display area DA.

The plurality of driving scan lines DSL1 to DSLn, the plurality of sensing scan lines SSL1 to SSLn, the plurality of data lines DL1 to DLm, the plurality of readout lines RL1 to RLm, and the plurality of pixels PX illustrated in FIG. 1 are disposed in the display area DA. For convenience of illustration, FIG. 5 illustrates only the plurality of driving scan lines DSL1 to DSLn and the plurality of sensing scan lines SSL1 to SSLn.

In an embodiment, the source driver 200 illustrated in FIG. 2 may be formed in the form of a plurality of chips. The source driver 200 may be provided in plural. In such an embodiment, the display device DD may include a plurality of source driving chips 201, 202, 203, and 204 in which the source drivers 200 are respectively embedded. The data driver 210 (see FIG. 2) and the sensing circuit 220 (see FIG. 2) may be disposed in each of the source driving chips 201, 202, 203, and 204.

The display device DD may further include a plurality of flexible films FCB1, FCB2, FCB3, and FCB4 connected to the display panel DP. The source driving chips 201, 202, 203, and 204 may be respectively mounted on the flexible films FCB1, FCB2, FCB3, and FCB4. The flexible films FCB1, FCB2, FCB3, and FCB4 may be attached to a first side of the display panel DP.

The display device DD may further include at least one circuit board PCB coupled to the plurality of flexible films FCB1, FCB2, FCB3, and FCB4. In an embodiment, a single circuit board PCB is provided in the display device DD, but the number of circuit boards PCB is not limited thereto. In an embodiment, the controller 100 (see FIG. 1 and FIG. 2), a voltage generator, and the like may be disposed on the circuit board PCB.

In an embodiment of the invention, the first side of the display panel DP may be a side adjacent to the first driving scan line DSL1 among the plurality of driving scan lines DSL1 to DSLn. A second side of the display panel DP opposite to the first side may be a side adjacent to an n-th driving scan line DSLn among the plurality of driving scan lines DSL1 to DSLn.

In an embodiment where the flexible films FCB1, FCB2, FCB3, and FCB4 are disposed adjacent to the first side of the display panel DP, distances between the source driving chips 201, 202, 203, and 204 and the driving scan lines DSL1 to DSLn may be different from each other. In an embodiment, for example, while the first driving scan line DSL1 is spaced apart from the source driving chips 201, 202, 203, and 204 by a first distance d1, the n-th driving scan line DSLn may be spaced apart from the source driving chips 201, 202, 203, and 204 by a second distance d2. Here, the second distance d2 may be longer than the first distance d1.

The plurality of sensing scan lines SSL1 to SSLn may be arranged in parallel with the plurality of driving scan lines DSL1 to DSLn. Accordingly, distances between the source driving chips 201, 202, 203, and 204 and the sensing scan lines SSL1 to SSLn may also be different from each other. In an embodiment, for example, while the first sensing scan line SSL1 is spaced apart from the source driving chips 201, 202, 203, and 204 by a third distance d3, an n-th sensing scan line SSLn may be spaced apart from the source driving chips 201, 202, 203, and 204 by a fourth distance d4. Here, the fourth distance d4 may be longer than the third distance d3.

Referring to FIGS. 2, 4, and 5, the sensing circuit 220 may be embedded in each of the source driving chips 201, 202, 203, and 204. The sensing circuits 220 may be connected to the plurality of readout lines RL1 to RLm. In an embodiment, for example, the first readout line RL1 may transmit sensed sensing data to the sensing circuit 220 when the first driving scan line DSL1 and the first sensing scan line SSL1 operate. In such an embodiment, the first readout line RL1 may transmit sensed sensing data to the sensing circuit 220 when the n-th driving scan line DSLn and the n-th sensing scan line SSLn operate. Here, a sensing period in which the first driving scan line DSL1 and the first sensing scan line SSL1 operate may be different from a sensing period in which the n-th driving scan line DSLn and the n-th sensing scan line SSLn operate. In an embodiment of the invention, the sensing period in which the first driving scan line DSL1 and the first sensing scan line SSL1 operate may be included in a first frame, and the sensing period in which the n-th driving scan line DSLn and the n-th sensing scan line SSLn operate may be included in a second frame.

Figure 6B:
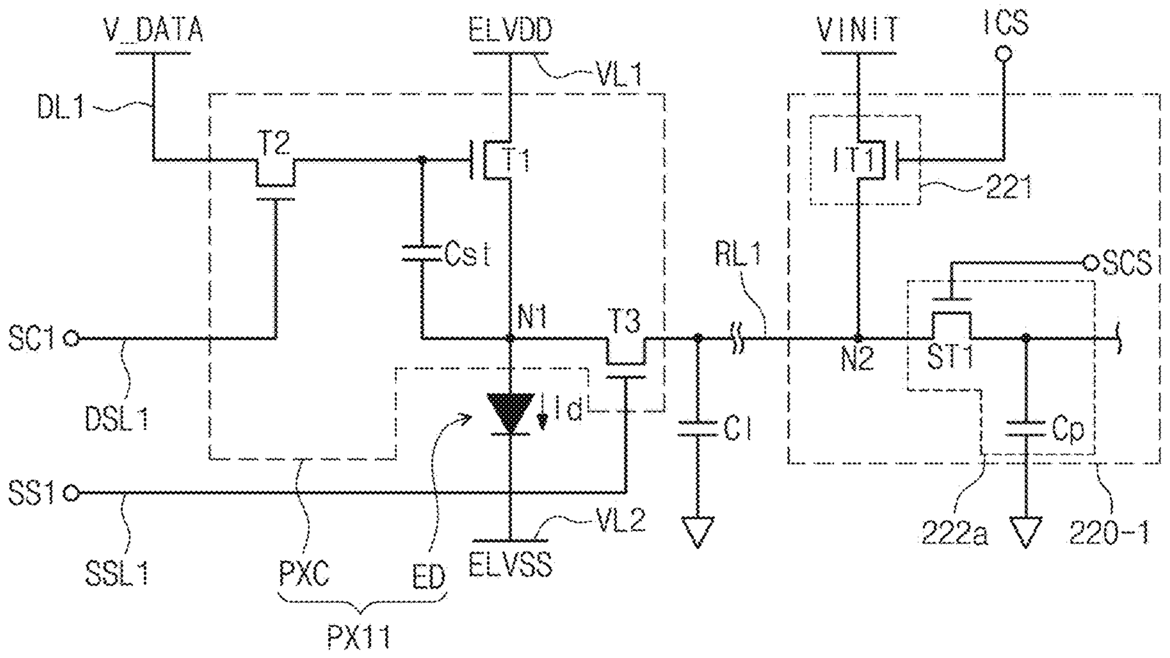
FIG. 6B is a circuit diagram illustrating one of pixels and a sensing circuit according to an embodiment of the invention.

FIG. 6A and FIG. 6B are circuit diagrams illustrating pixels and sensing circuits according to embodiments of the invention.

FIG. 6A illustrates an equivalent circuit diagram of an embodiment of the first pixel PX11 of the plurality of pixels PX illustrated in FIG. 1. In such an embodiment, the plurality of pixels PX have a same circuit configuration as each other. Accordingly, for convenience of description, the circuit configuration of the first pixel PX11 will hereinafter be described in detail, and any repetitive detailed description of the remaining pixels will be omitted. In addition, FIG. 6A illustrates some components of the initialization circuit unit 221 and the sampling circuit unit 222 of an embodiment of the sensing circuit 220 illustrated in FIG. 4.

Referring to FIG. 6A, the first pixel PX11 is connected to the first data line DL1, the first driving scan line DSL1, the first sensing scan line SSL1, and the first readout line RL1.

The first pixel PX11 includes the light emitting element ED and the pixel driving circuit PXC. The light emitting element ED may be a light emitting diode. In an embodiment of the invention, the light emitting element ED may be an organic light emitting diode including an organic light emitting layer.

The pixel driving circuit PXC includes first to third transistors T1, T2, and T3 and a capacitor Cst. At least one of (i.e., at least one selected from) the first to third transistors T1, T2, and T3 may be a transistor having a low-temperature polycrystalline silicon ("LTPS") semiconductor layer. Each of the first to third transistors T1, T2, and T3 may be an N-type transistor. However, an embodiment of the invention is not limited thereto. Alternatively, each of the first to third transistors T1, T2, and T3 may be a P-type transistor. Alternatively, some of the first to third transistors T1, T2, and T3 may be N-type transistors, and the others may be P-type transistors. In an embodiment, at least one of the first to third transistors T1, T2, and T3 may be a transistor having an oxide semiconductor layer.

The configuration of an embodiment of the pixel driving circuit PXC according to the invention is not limited to the embodiment illustrated in FIG. 6A. The pixel driving circuit PXC illustrated in FIG. 6A is only one embodiment, and the configuration of the pixel driving circuit PXC may be variously modified.

The first transistor T1 is connected between a first driving voltage line VL1 that receives a first driving voltage ELVDD and the light emitting element ED. The first transistor T1 includes a first electrode connected to the first driving voltage line VL1, a second electrode electrically connected to an anode of the light emitting element ED, and a third electrode connected to one end of the capacitor Cst. Here, a contact point where the anode of the light emitting element ED and the second electrode of the first transistor T1 are connected may be referred to as a first node N1. In this specification, "a transistor is connected to a signal line" means "one electrode of first to third electrodes of the transistor has an integral shape (or integrally formed as a single unitary unit) with the signal line or is connected to the signal line through a connection electrode". In addition, "a transistor is electrically connected to another transistor" means "one electrode of first to third electrodes of the transistor has an integral shape (or integrally formed as a single unitary unit) with one electrode of first to third electrodes of the other transistor or is connected to the one electrode of the first to third electrodes of the other transistor through a connection electrode".

The first transistor T1 may receive a data signal V_DATA transmitted from the first data line DL1 based on a switching operation of the second transistor T2 and may supply a driving current Id to the light emitting element ED.

The second transistor T2 is connected between the first data line DL1 and the third electrode of the first transistor T1. The second transistor T2 includes a first electrode connected to the first data line DL1, a second electrode connected to the third electrode of the first transistor T1, and a third electrode connected to the first driving scan line DSL1. The second transistor T2 may be turned on in response to the first driving scan signal SC1 transmitted through the first driving scan line DSL1 to transmit, to the third electrode of the first transistor T1, the data signal V_DATA transmitted from the first data line DL1.

The third transistor T3 is connected between the second electrode of the first transistor T1 and the first readout line RL1. The third transistor T3 includes a first electrode connected to the first node N1, a second electrode connected to the first readout line RL1, and a third electrode connected to the first sensing scan line SSL1. The third transistor T3 may be turned on in response to the first sensing scan signal SS1 received through the first sensing scan line SSL1 to electrically connect the first readout line RL1 and the first node N1.

The one end of the capacitor Cst is connected to the third electrode of the first transistor T1, and the other end thereof is connected to the first node N1. A cathode of the light emitting element ED may be connected to a second driving voltage line VL2 that transmits a second driving voltage ELVSS. The second driving voltage ELVSS may have a lower voltage level than the first driving voltage ELVDD.

The sensing circuit 220 (see FIG. 2) may be connected to the plurality of readout lines RL1 to RLm. The sensing circuit 220 may receive sensing data from the plurality of readout lines RL1 to RLm. The initialization circuit unit 221 illustrated in FIG. 4 may include a plurality of initialization transistors respectively connected to the plurality of readout lines RL1 to RLm. Although FIG. 6A illustrates only an initialization transistor IT1 connected to the first readout line RL1, the initialization circuit unit 221 may further include the initialization transistors respectively connected to the remaining readout lines RL2 to RLm among the readout lines RL1 to RLm illustrated in FIG. 1.

The sampling circuit unit 222 illustrated in FIG. 4 may include a plurality of sampling transistors respectively connected to the plurality of readout lines RL1 to RLm. Although FIG. 6A illustrates only a sampling transistor ST1 connected to the first readout line RL1, the sampling circuit unit 222 may further include the sampling transistors respectively connected to the remaining readout lines RL2 to RLm among the readout lines RL1 to RLm illustrated in FIG. 1.

As illustrated in FIG. 6B, in an alternative embodiment of a sensing circuit 220-1 according to the invention, a sampling circuit unit 222*a* may further include a sampling capacitor Cp connected to the first readout line RL1 through a sampling transistor ST1. The sampling capacitor Cp may store a signal sampled through the sampling transistor ST1. Although FIG. 6B illustrates only the sampling capacitor Cp connected to the first readout line RL1, the sampling circuit unit 222*a* may further include sampling capacitors respectively connected to the remaining readout lines RL2 to RLm among the readout lines RL1 to RLm illustrated in FIG. 1.

Referring to FIG. 6B, in such an embodiment, a line capacitor C1 may be connected to the first readout line RL1. The line capacitor C1 may be a parasitic capacitor formed in the display panel DP (see FIG. 1) by the first readout line RL1.

In an embodiment, as shown in FIGS. 6A and 6B, the initialization transistor IT1 may include a first electrode that receives an initialization voltage VINIT, a second electrode connected to the first readout line RL1, and a third electrode that receives the initialization control signal ICS. Here, a contact point to which the first readout line RL1 and the initialization transistor IT1 are connected may be referred to as a second node N2. The initialization transistor IT1 may initialize the potential of the first readout line RL1 to the initialization voltage VINIT in response to the initialization control signal ICS. In an embodiment of the invention, the initialization voltage VINIT may have a lower voltage level than the second driving voltage ELVSS.

The sampling transistor ST1 includes a first electrode connected to the second node N2, a second electrode connected to the ADC 223 (see FIG. 4), and a third electrode that receives the sampling control signal SCS. Here, the sampling transistor ST1 may receive the sensing signal outputted from the first readout line RL1 in response to the sampling control signal SCS. The sampling circuit units 222 or 222*a* may further include various circuit elements (e.g., the sampling capacitor Cp) for sampling the sensing signals, in addition to the sampling transistor ST1. The sampled signals sampled through the sampling circuit units 222 and 222*a* may be transmitted to the ADC 223.

Figure 7:
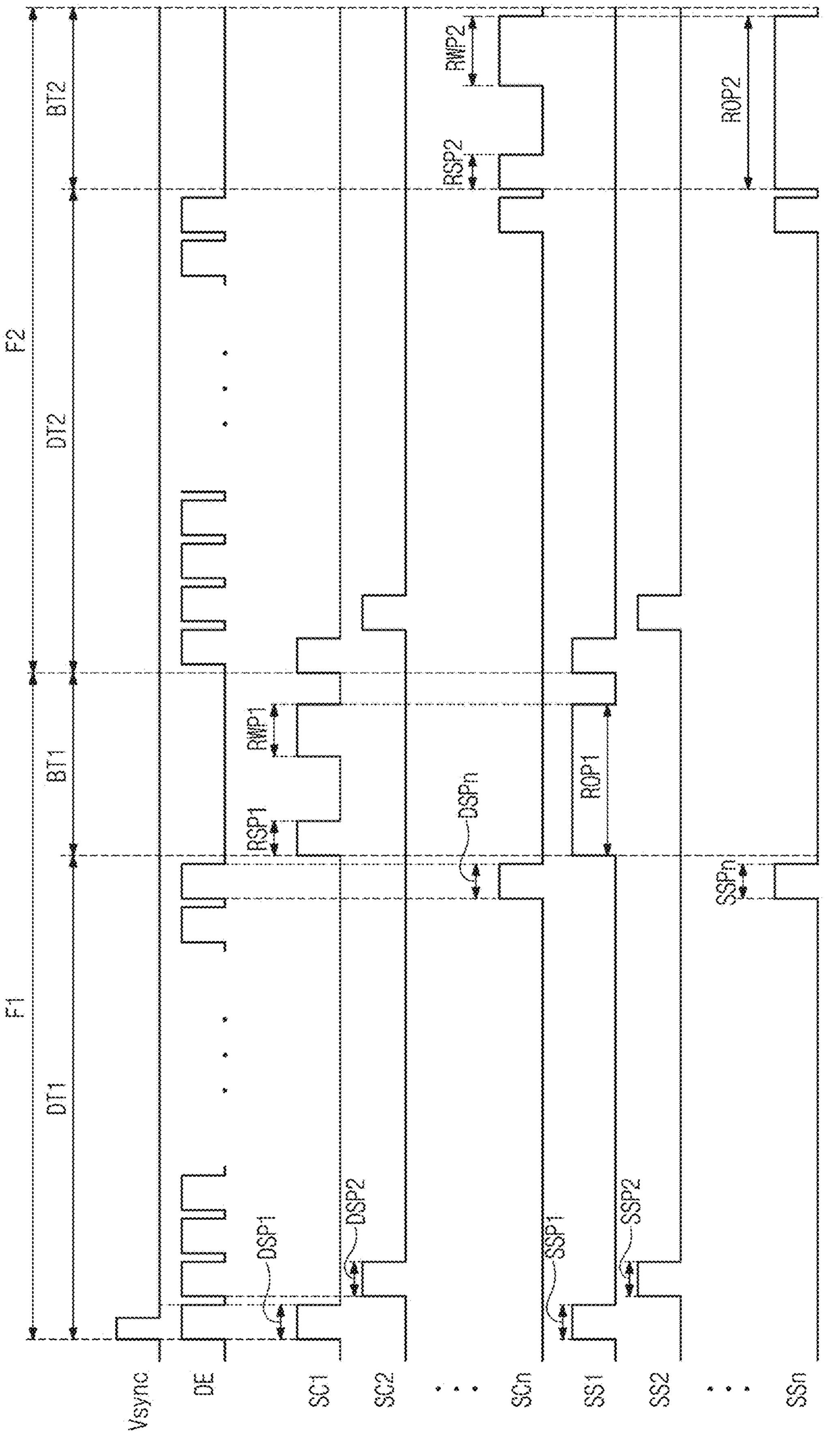
FIG. 7 is a waveform diagram for describing an operation of the pixel illustrated in FIG. 6A.
Figure 8A:
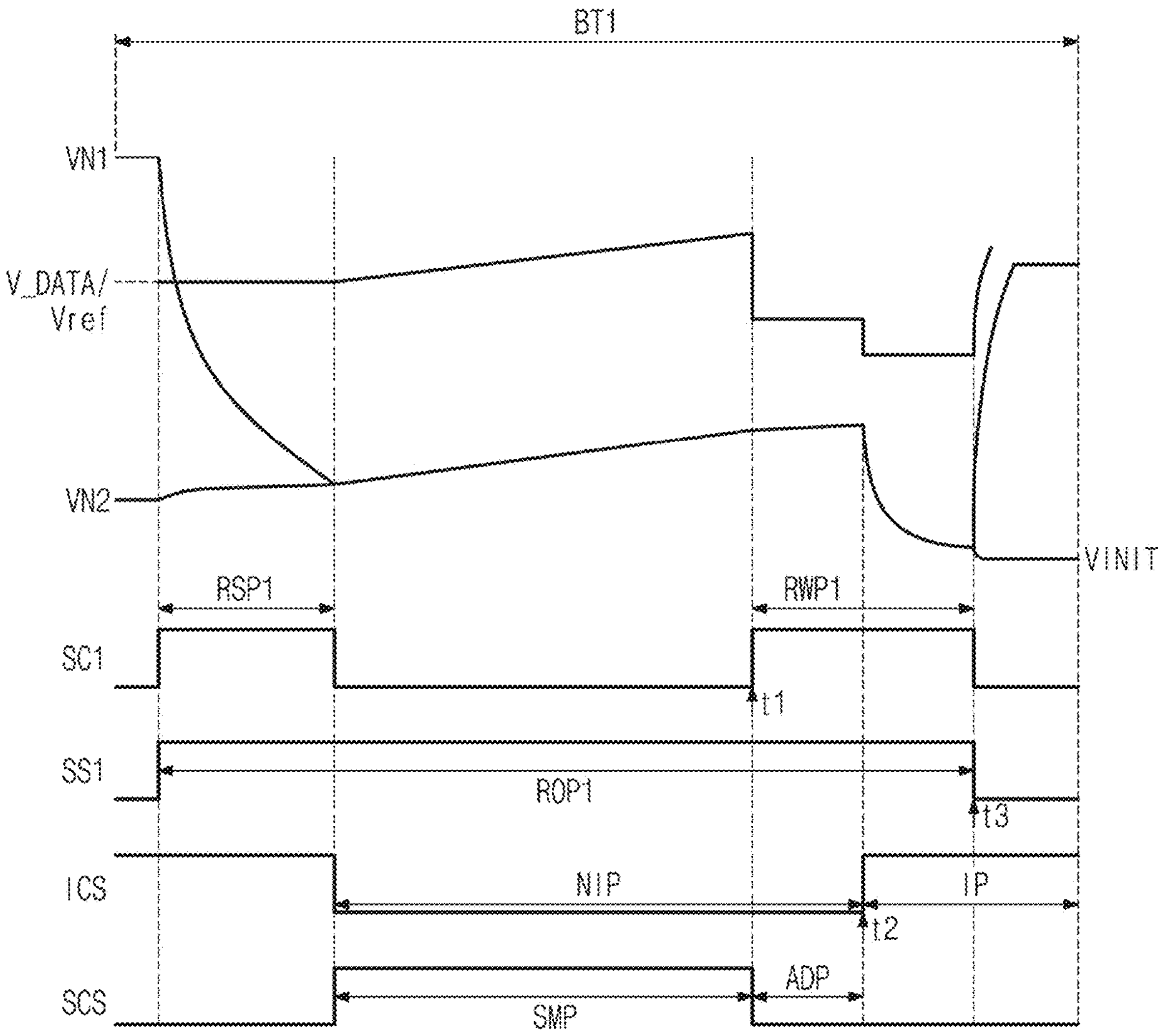
FIG. 8A is a waveform diagram for describing operations of the pixel and a sensing circuit in the first blank period illustrated in FIG. 7.
Figure 8B:
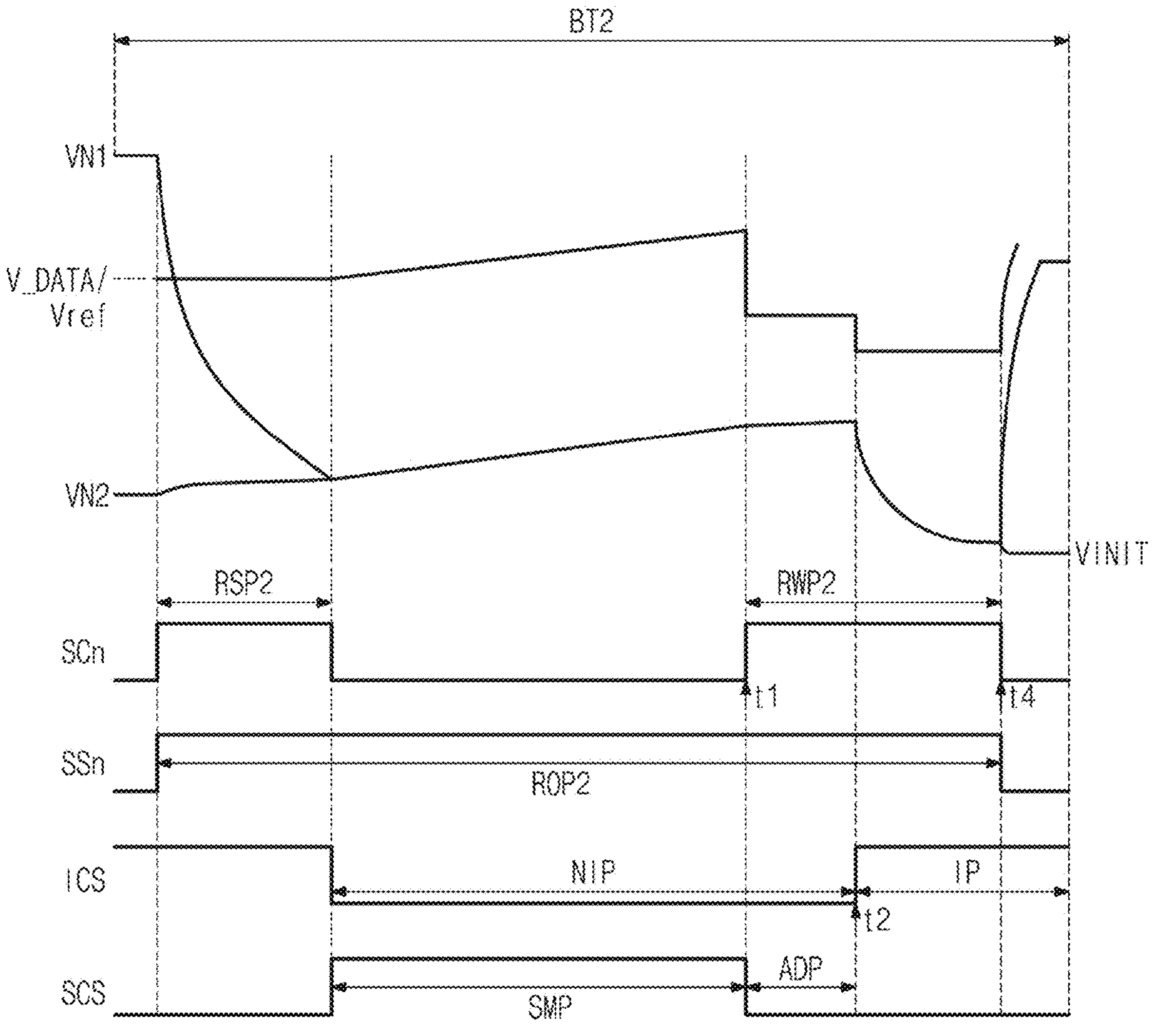
FIG. 8B is a waveform diagram for describing operations of the pixel and a sensing circuit in the second blank period illustrated in FIG. 7.

FIG. 7 is a waveform diagram for describing an operation of the pixel illustrated in FIG. 6A. FIG. 8A is a waveform diagram for describing operations of the pixel and a sensing circuit in the first blank period illustrated in FIG. 7, and FIG. 8B is a waveform diagram for describing operations of the pixel and a sensing circuit in the second blank period illustrated in FIG. 7.

Referring to FIGS. 1, 6A, and 7, the display device DD displays an image through the display panel DP. A time unit (period or duration) in which the display panel DP displays a frame image may be referred to as a frame. When an operating frequency of the display panel DP is about 60 hertz (Hz), about 60 frames may occur in about one second, and time corresponding to each of the frames may be about 16.67 milliseconds (ms). When the operating frequency of the display panel DP is about 120 Hz, about 120 frames may occur in about one second, and time corresponding to each of the frames may be about 8.3 ms. The period of each of the frames may be determined by a vertical synchronization signal Vsync. FIG. 7 illustrates two frames (hereinafter, referred to as first and second frames F1 and F2) among the frames for convenience of illustration and description.

Each of the frames F1 and F2 may include a corresponding one of display periods DT1 and DT2 and a corresponding one of blank periods BT1 and BT2. The display periods DT1 and DT2 may be periods in which an image is substantially displayed, and the blank periods BT1 and BT2 may be periods which are disposed between two adjacent display periods (e.g., the display periods DT1 and DT2) and in which no image is substantially displayed. In an embodiment of the invention, the blank periods BT1 and BT2 may be used as sensing periods for sensing the characteristic of each of the pixels PX through the sensing circuit 220.

In an embodiment of the invention, a first frame F1 includes a first display period DT1 and a first blank period BT1, and a second frame F2 includes a second display period DT2 and a second blank period BT2. A data enable signal DE is activated during the first and second display periods DT1 and DT2 and is deactivated during the first and second blank periods BT1 and BT2.

The driving scan signals SC1 to SCn are respectively applied to the driving scan lines DSL1 to DSLn during each of the display periods DT1 and DT2 of the frames F1 and F2. The driving scan signals SC1 to SCn are sequentially activated within each of the display periods DT1 and DT2. in an embodiment, activation periods of the driving scan signals SC1 to SCn may sequentially occur within each of the display periods DT1 and DT2. Each of the driving scan signals SC1 to SCn may have a high level during a corresponding one of the activation periods and have a low level during a deactivation period. However, an embodiment of the invention is not limited thereto. In an embodiment where the second transistor T2 illustrated in FIG. 6A is formed as the P-type transistor, each of the driving scan signals SC1 to SCn may have a low level during the activation period and have a high level during the deactivation period. For convenience of description, the activation periods of the driving scan signals SC1 to SCn in each of the display periods DT1 and DT2 may be defined as driving scan periods DSP1 to DSPn.

The sensing scan signals SS1 to SSn are respectively applied to the sensing scan lines SSL1 to SSLn during each of the display periods DT1 and DT2 of the frames F1 and F2. The sensing scan signals SS1 to SSn are sequentially activated within each of the display periods DT1 and DT2. in an embodiment, activation periods of the sensing scan signals SS1 to SSn may sequentially occur within each of the display periods DT1 and DT2. Each of the sensing scan signals SS1 to SSn may have a high level during a corresponding one of the activation periods and have a low level during a deactivation period. However, an embodiment of the invention is not limited thereto. In an embodiment where the third transistor T3 illustrated in FIG. 6A is formed as the P-type transistor, each of the sensing scan signals SS1 to SSn may have a low level during the activation period and have a high level during the deactivation period. For convenience of description, the activation periods of the sensing scan signals SS1 to SSn in each of the display periods DT1 and DT2 may be defined as sensing scan periods SSP1 to SSPn.

When a first driving scan signal SC1 of the high level is provided through the first driving scan line DSL1 during a first driving scan period DSP1, the second transistor T2 is turned on in response to the first driving scan signal SC1. The data signal V_DATA provided to the first data line DL1 is provided to the first transistor T1 through the turned-on second transistor T2. When the data signal V_DATA is applied to the third electrode of the first transistor T1, the first transistor T1 may be turned on.

In an embodiment of the invention, during the display periods DT1 and DT2, the first readout line RL1 may have a state of being initialized to the initialization voltage VINIT. When a first sensing scan signal SS1 of the high level is provided through the first sensing scan line SSL1 during a first sensing scan period SSP1, the third transistor T3 is turned on in response to the first sensing scan signal SS1. The initialization voltage VINIT supplied to the first readout line RL1 is supplied to the first node N1 through the turned-on third transistor T3.

The first sensing scan period SSP1 of the first sensing scan signal SS1 may overlap the first driving scan period DSP1 of the first driving scan signal SC1. In this case, the data signal V_DATA and the initialization voltage VINIT may be respectively applied to both ends of the capacitor Cst in the overlapping period, and an electric charge corresponding to a voltage difference (V_DATA−VINIT) between the both ends may be stored in the capacitor Cst.

The second driving voltage ELVSS is applied to the cathode of the light emitting element ED. Accordingly, when the initialization voltage VINIT having a voltage level lower than that of the second driving voltage ELVSS is applied to the first node N1, no current flows in the light emitting element ED.

During the deactivation period of the first driving scan signal SC1, the second transistor T2 is turned off, and during the deactivation period of the first sensing scan signal SS1, the third transistor T3 is turned off. Even when the second transistor T2 is turned off during the deactivation period of the first driving scan signal SC1, the first transistor T1 may remain turned on by the electric charge stored in the capacitor Cst. Accordingly, the driving current Id flows through the first transistor T1, and when the voltage level of the anode of the light emitting element ED becomes higher than the voltage level of the cathode by the driving current Id, the driving current Id may flow to the light emitting element ED, and thus the light emitting element ED may emit light.

At least one driving scan signal of the plurality of driving scan signals SC1 to SCn may be activated during each of the blank periods BT1 and BT2 of the frames F1 and F2. In an embodiment of the invention, the first driving scan signal SC1 among the plurality of driving scan signals SC1 to SCn may be activated during the first blank period BT1, and an n-th driving scan signal SCn among the plurality of driving scan signals SC1 to SCn may be activated during the second blank period BT2. However, an embodiment of the invention is not limited thereto. At least one of the remaining driving scan signals SC2 to SCn among the plurality of driving scan signals SC1 to SCn may be activated during the second blank period BT2. At least one of the plurality of driving scan signals SC1 to SCn may be randomly selected for each of the frames and may be activated during a corresponding one of the blank periods BT1 and BT2.

In an embodiment, a driving scan signal activated in each of the blank periods BT1 and BT2 among the driving scan signals SC1 to SCn may include a reference scan period and a rewriting period. In an embodiment of the invention, the first driving scan signal SC1 activated in the first blank period BT1 may include a first reference scan period RSP1 and a first rewriting period RWP1, and the n-th driving scan signal SCn activated in the second blank period BT2 may include a second reference scan period RSP2 and a second rewriting period RWP2.

In an embodiment, the first reference scan period RSP1 may have a same duration as the second reference scan period RSP2. In such an embodiment, the first reference scan period RSP1 may have a same duration as the first driving scan period DSP1. However, an embodiment of the invention is not limited thereto. Alternatively, the first reference scan period RSP1 and the first driving scan period DSP1 may have different durations from each other. In an embodiment, for example, the first reference scan period RSP1 may have a duration shorter than that of the first driving scan period DSP1.

The first rewriting period RWP1 may have a duration longer than that of the first reference scan period RSP1. The first rewriting period RWP1 and the second rewriting period RWP2 may have different durations from each other. in an embodiment, as illustrated in FIG. 5, the first driving scan line DSL1 may be spaced apart from the sensing circuit 220 by the first distance d1, and the n-th driving scan line DSLn may be spaced apart from the sensing circuit 220 by the second distance d2. Here, the second distance d2 may be longer than the first distance d1. In an embodiment, the duration of the rewriting period of each of the driving scan signals may be adjusted based on a distance between a corresponding one of the driving scan lines and the sensing circuit 220. In such an embodiment, as the distance between the driving scan line and the sensing circuit 220 increases, the duration of the rewriting period of the driving scan signal applied to the driving scan line may increase.

At least one of the plurality of sensing scan signals SS1 to SSn may be activated during each of the blank periods BT1 and BT2 of the frames F1 and F2. In an embodiment of the invention, the first sensing scan signal SS1 among the plurality of sensing scan signals SS1 to SSn may be activated during the first blank period BT1, and an n-th sensing scan signal SSn among the plurality of sensing scan signals SS1 to SSn may be activated during the second blank period BT2. However, an embodiment of the invention is not limited thereto. At least one of the remaining sensing scan signals SS2 to SSn among the plurality of sensing scan signals SS1 to SSn may be activated during the second blank period BT2. At least one of the plurality of sensing scan signals SS1 to SSn may be randomly selected for each of the frames and may be activated during a corresponding one of the blank periods BT1 and BT2.

In an embodiment, a sensing scan signal activated in each of the blank periods BT1 and BT2 among the sensing scan signals SS1 to SSn may include a readout period. In an embodiment of the invention, the first sensing scan signal SS1 activated in the first blank period BT1 may include a first readout period ROP1, and the n-th sensing scan signal SSn activated in the second blank period BT2 may include a second readout period ROP2.

The first readout period ROP1 and the second readout period ROP2 may have different durations from each other. In an embodiment, as illustrated in FIG. 5, the first sensing scan line SSL1 may be spaced apart from the sensing circuit 220 by the third distance d3, and the n-th sensing scan line SSLn may be spaced apart from the sensing circuit 220 by the fourth distance d4. Here, the fourth distance d4 may be longer than the third distance d3. In an embodiment, the duration of the readout period of each of the sensing scan signals may be adjusted based on a distance between a corresponding one of the sensing scan lines and the sensing circuit 220. In such an embodiment, as the distance between the sensing scan line and the sensing circuit 220 increases, the duration of the readout period of the sensing scan signal applied to the sensing scan line may increase.

Referring to FIG. 6A and FIG. 8A, the first driving scan signal SC1 may be activated to the high level during the first reference scan period RSP1 of the first blank period BT1. When the first driving scan signal SC1 of the high level is provided through the first driving scan line DSL1 during the first reference scan period RSP1, the second transistor T2 is turned on in response to the first driving scan signal SC1.

As shown in FIG. 8A, a reference data signal Vref is provided to the first data line DL1 during the first reference scan period RSP1 of the first blank period BT1. The reference data signal Vref may be provided to the first transistor T1 through the turned-on second transistor T2. In an embodiment of the invention, the level of the reference data signal Vref may be about 5 volts (V) but is not particularly limited. When the reference data signal Vref is applied to the third electrode of the first transistor T1, the first transistor T1 may be turned on. The reference data signal Vref is defined as a signal applied to the first data line DL1 for sensing in the first blank period BT1, and the data signal V_DATA is defined as a signal applied to the first data line DL1 for light emission in the first display period DT1. In an embodiment of the invention, while the reference data signal Vref does not affect the light emission of the light emitting element ED, the driving current Id of the light emitting element ED may be determined by the data signal V_DATA in the first display period DT1.

In an embodiment of the invention, during the first reference scan period RSP1 of the first blank period BT1, the first readout line RL1 may have a state of being initialized to the initialization voltage VINIT. In an embodiment, when the initialization transistor IT1 is turned on in response to the initialization control signal ICS, the initialization voltage VINIT may be applied to the first readout line RL1. In an activation period of the initialization control signal ICS (i.e., an initialization period IP), the first readout line RL1 may be initialized to the initialization voltage VINIT, and in a deactivation period of the initialization control signal ICS (i.e., a non-initialization period NIP), the initialization voltage VINIT may not be applied to the first readout line RL1.

The first sensing scan signal SS1 may be activated to the high level during the first readout period ROP1 of the first blank period BT1. When the first sensing scan signal SS1 of the high level is provided through the first sensing scan line SSL1 during the first readout period ROP1, the third transistor T3 is turned on in response to the first sensing scan signal SS1. The initialization voltage VINIT supplied to the first readout line RL1 is supplied to the first node N1.

In an embodiment of the invention, the first readout period ROP1 and the first reference scan period RSP1 may partially overlap each other. In such an embodiment, the reference data signal Vref and the initialization voltage VINIT may be respectively applied to both ends of the capacitor Cst in the overlapping period, and an electric charge corresponding to a voltage difference (Vref−VINIT) between the both ends may be stored in the capacitor Cst.

The second driving voltage ELVSS is applied to the cathode of the light emitting element ED. Accordingly, when the initialization voltage VINIT having a voltage level lower than that of the second driving voltage ELVSS is applied to the first node N1, no current flows in the light emitting element ED. After the first reference scan period RSP1 ends, the sampling control signal SCS may be activated, and the initialization control signal ICS may be deactivated. An activation period of the sampling control signal SCS may be defined as a sampling period SMP. During the sampling period SMP, the sampling circuit unit 222 may receive the sensing signal through the first readout line RL1. At least during the sampling period SMP, the first sensing scan signal SS1 may be activated. That is, the sampling period SMP and the first readout period ROP1 may overlap each other.

When the initialization control signal ICS is deactivated after the first reference scan period RSP1 ends, the initialization voltage VINIT may not be applied to the second node N2. Then, potentials VN1 and VN2 of the first and second nodes N1 and N2 may gradually increase.

After the sampling period SMP ends, the first rewriting period RWP1 may start. That is, the first rewriting period RWP1 may start at a first time point t1 at which the sampling period SMP ends. When the first rewriting period RWP1 starts, the data signal V_DATA instead of the reference data signal Vref may be applied again to the first data line DL1. Accordingly, the rise of the potentials VN1 and VN2 of the first and second nodes N1 and N2 may slow or stop at the first time point t1.

Thereafter, when the initialization control signal ICS is activated at a second time point t2, the potentials VN1 and VN2 of the first and second nodes N1 and N2 may be discharged by the initialization voltage VINIT. In an embodiment of the invention, the first time point t1 at which the first rewriting period RWP1 starts may precede the second time point t2 at which the initialization control signal ICS is activated.

The first time point t1 at which the sampling period SMP ends and the second time point t2 at which the initialization period IP starts may be apart from each other by a predetermined time interval. Here, a period between the first time point t1 at which the sampling period SMP ends and the second time point t2 at which the initialization period IP starts may be defined as a waiting period ADP. The waiting period ADP may be a period set to secure time for the ADC 223 to effectively process the sampled signals. In an embodiment, the length of the waiting period ADP may be set in consideration of variations in the processing speed of the ADC's 223 among the plurality of source driving chips 201 to 204 (see FIG. 4), and the like. In such an embodiment, as the waiting period ADP is secured as described above, noise may be effectively prevented from being introduced into the ADC 223 while the ADC 223 processes the sampled signals.

In such an embodiment, because the first time point t1 at which the first rewriting period RWP1 starts precedes the second time point t2 at which the initialization period IP starts, the rise of the potentials VN1 and VN2 of the first and second nodes N1 and N2 may be preemptively blocked before the initialization period IP is entered. Accordingly, after the initialization period IP is entered, the potentials VN1 and VN2 of the first and second nodes N1 and N2 may be rapidly discharged to the initialization voltage VINIT.

Thereafter, the first driving scan signal SC1 and the first sensing scan signal SS1 may be simultaneously deactivated at a third time point t3, and thus the sensing period of the first readout line RL1 may end.

Referring to FIG. 6A and FIG. 8B, the n-th driving scan signal SCn may be activated to the high level during the second reference scan period RSP2 of the second blank period BT2. When the n-th driving scan signal SCn of the high level is provided through the n-th driving scan line DSLn during the second reference scan period RSP2, the second transistor T2 is turned on in response to the n-th driving scan signal SCn.

in such an embodiment, the reference data signal Vref is provided to the first data line DL1 during the second reference scan period RSP2 of the second blank period BT2. The reference data signal Vref may be provided to the first transistor T1 through the turned-on second transistor T2. The reference data signal Vref is defined as a signal applied to the first data line DL1 for sensing in the second blank period BT2, and the data signal V_DATA is defined as a signal applied to the first data line DL1 for light emission in the second display period DT2. In an embodiment of the invention, while the reference data signal Vref does not affect the light emission of the light emitting element ED, the driving current Id of the light emitting element ED may be determined by the data signal V_DATA in the second display period DT2.

In an embodiment of the invention, during the second reference scan period RSP2 of the second blank period BT2, the first readout line RL1 may have a state of being initialized to the initialization voltage VINIT.

The n-th sensing scan signal SSn may be activated to the high level during the second readout period ROP2 of the second blank period BT2. When the n-th sensing scan signal SSn of the high level is provided through the n-th sensing scan line SSLn during the second readout period ROP2, the third transistor T3 is turned on in response to the n-th sensing scan signal SSn. The initialization voltage VINIT supplied to the first readout line RL1 is supplied to the first node N1.

In an embodiment of the invention, the second readout period ROP2 and the second reference scan period RSP2 may partially overlap each other. In such an embodiment, the reference data signal Vref and the initialization voltage VINIT may be respectively applied to both ends of the capacitor Cst in the overlapping period, and an electric charge corresponding to the voltage difference Vref−VINIT between the both ends may be stored in the capacitor Cst.

The second driving voltage ELVSS is applied to the cathode of the light emitting element ED. Accordingly, when the initialization voltage VINIT having a voltage level lower than that of the second driving voltage ELVSS is applied to the first node N1, no current flows in the light emitting element ED.

Thereafter, after the second reference scan period RSP2 ends, the sampling control signal SCS may be activated, and the initialization control signal ICS may be deactivated. An activation period of the sampling control signal SCS may be defined as the sampling period SMP. During the sampling period SMP, the sampling circuit unit 222 may receive the sensing signal through the first readout line RL1. The n-th sensing scan signal SSn may be activated at least during the sampling period SMP. That is, the sampling period SMP and the second readout period ROP2 may overlap each other.

When the initialization control signal ICS is deactivated after the second reference scan period RSP2 ends, the initialization voltage VINIT may not be applied to the second node N2. Then, the potentials VN1 and VN2 of the first and second nodes N1 and N2 may gradually increase.

After the sampling period SMP ends, the second rewriting period RWP2 may start. In such an embodiment, the second rewriting period RWP2 may start at the first time point t1 at which the sampling period SMP ends. When the second rewriting period RWP2 starts, the data signal V_DATA instead of the reference data signal Vref may be applied again to the first data line DL1. Accordingly, the rise of the potentials VN1 and VN2 of the first and second nodes N1 and N2 may slow or stop at the first time point t1.

Thereafter, when the initialization control signal ICS is activated at the second time point t2, the potentials VN1 and VN2 of the first and second nodes N1 and N2 may be decreased by the initialization voltage VINIT. The n-th driving scan signal SCn and the n-th sensing scan signal SSn may be simultaneously deactivated at a fourth time point t4, and thus the sensing period of the first readout line RL1 may end.

The waiting period ADP may be defined between the first time point t1 at which the sampling period SMP ends and the second time point t2 at which the initialization period IP starts. The waiting period ADP may be a period set to secure time for the ADC 223 to effectively process the sampled signals. In such an embodiment, as the waiting period ADP is secured as described above, noise may be effectively prevented from being introduced into the ADC 223 while the ADC 223 processes the sampled signals.

In such an embodiment, because the first time point t1 at which the second rewriting period RWP2 starts precedes the second time point t2 at which the initialization period IP starts, the rise of the potentials VN1 and VN2 of the first and second nodes N1 and N2 may be preemptively blocked before the initialization period IP is entered. Accordingly, after the initialization period IP is entered, the potentials VN1 and VN2 of the first and second nodes N1 and N2 may be rapidly discharged to the initialization voltage VINIT. When the first time point t1 at which the second rewriting period RWP2 starts is later than the second time point t2 at which the initialization period IP starts, the potentials VN1 and VN2 of the first and second nodes N1 and N2 may continue to rise, even when the initialization period IP has started, until the second rewriting period RWP2 starts. As the period during which the potentials VN1 and VN2 of the first and second nodes N1 and N2 increase becomes longer, the display device may enter a next display period while in a state in which the potentials VN1 and VN2 of the first and second nodes N1 and N2 are not sufficiently initialized, which may result in the light emitting element ED generating light having a higher or lower luminance than desired.

In addition, the duration of the second rewriting period RWP2 may be longer than the duration of the first rewriting period RWP1. In particular, an interval from the second time point t2 at which the initialization control signal ICS is activated to the fourth time point t4 at which the second rewriting period RWP2 is deactivated may be longer than an interval from the second time point t2 at which the initialization control signal ICS is activated to the third time point t3 at which the first rewriting period RWP1 is deactivated. Accordingly, as the duration of the second rewriting period RWP2 is extended, a period in which the potential VN1 of the first node N1 is lowered by the initialization voltage VINIT may be further secured. Accordingly, in such an embodiment, dark lines, bright lines, etc. may be effectively prevented from being viewed, which occurs when the potential VN1 of the first node N1 of each of pixels connected to the n-th driving scan line DSLn, which is relatively far from the sensing circuit 220, is not sufficiently initialized.

In such an embodiment, a luminance difference may be improved between pixels connected to the first driving scan line DSL1 and the pixels connected to the n-th driving scan line DSLn.

Figure 9:
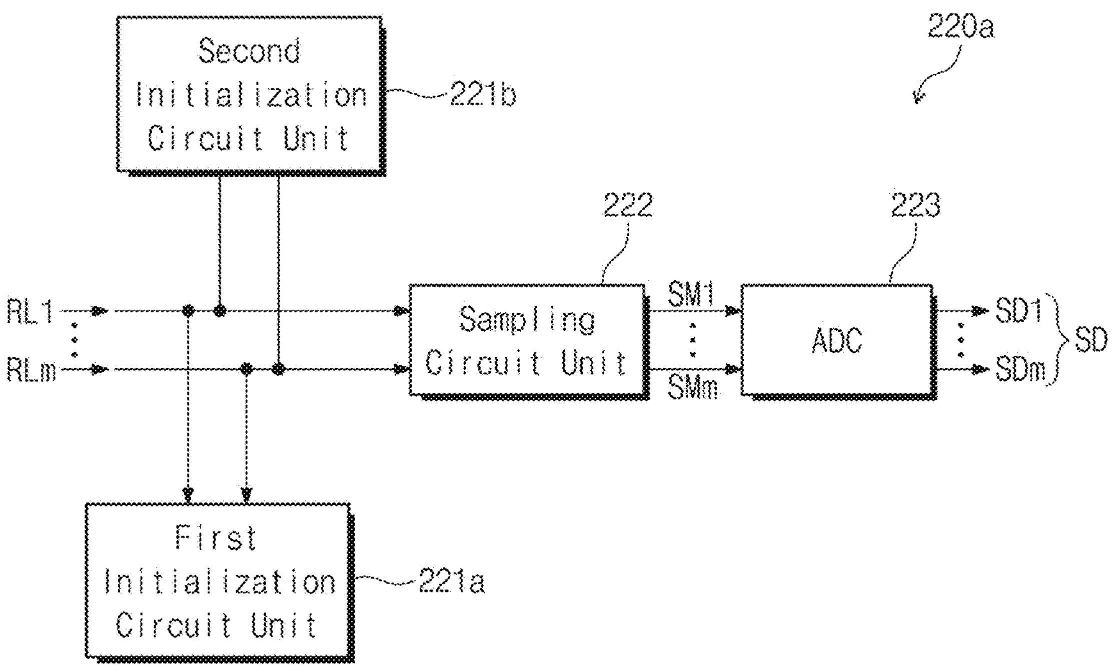
FIG. 9 is a block diagram of a sensing circuit according to an embodiment of the invention.
Figure 10:
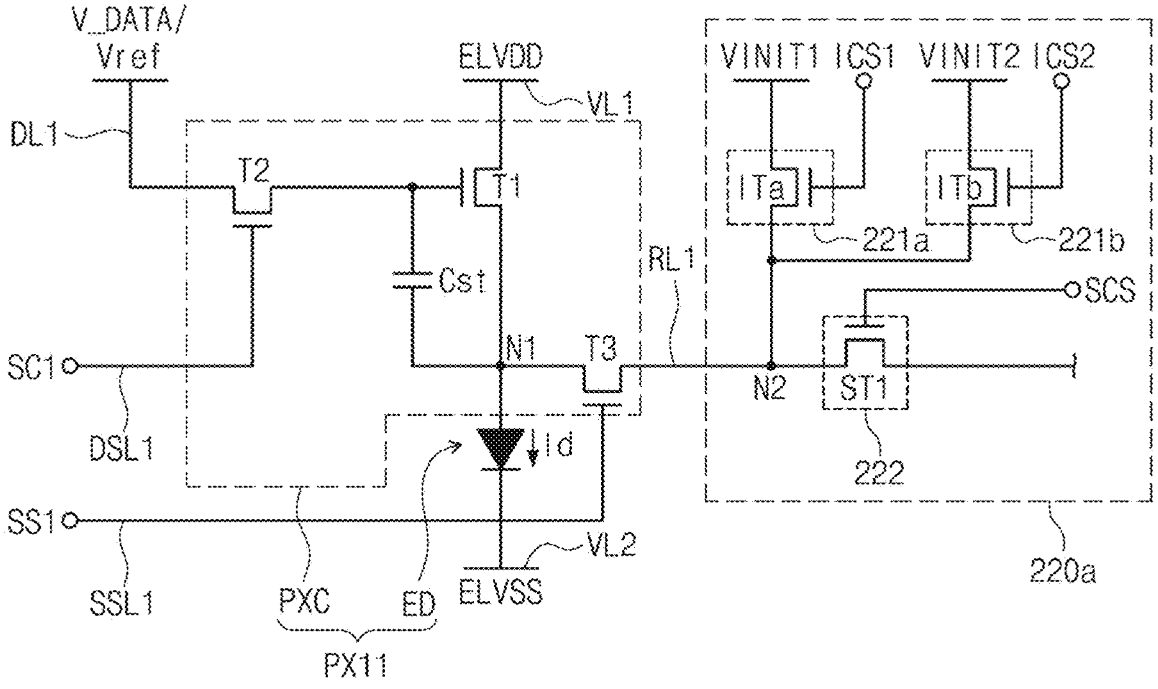
FIG. 10 is a circuit diagram illustrating one of pixels and a sensing circuit according to an embodiment of the invention.

FIG. 9 is a block diagram of a sensing circuit according to an embodiment of the invention, and FIG. 10 is a circuit diagram illustrating one of pixels and a sensing circuit according to an embodiment of the invention. The same or like elements shown in FIGS. 9 and 10 as those in FIGS. 3 and 6A have been labeled with the same reference characters as used above, and any repetitive detailed description thereof will hereinafter be omitted or simplified.

Referring to FIG. 9, an embodiment of a sensing circuit 220*a* may include a first initialization circuit unit 221*a*, a second initialization circuit unit 221*b*, a sampling circuit unit 222, and an ADC 223.

The first initialization circuit unit 221*a* may be electrically connected to the readout lines RL1 to RLm and may initialize the readout lines RL1 to RLm in response to a first initialization control signal ICS1. The second initialization circuit unit 221*b* may be electrically connected to the readout lines RL1 to RLm and may initialize the readout lines RL1 to RLm in response to a second initialization control signal ICS2. The first initialization circuit unit 221*a* and the second initialization circuit unit 221*b* may selectively operate. In an embodiment of the invention, in the blank period, the second initialization circuit unit 221*b* may operate before the first initialization circuit unit 221*a* does.

The sampling circuit unit 222 may be electrically connected to the readout lines RL1 to RLm and may sample the sensing signals respectively outputted from the readout lines RL1 to RLm in response to a sampling control signal SCS. The sensing signals respectively outputted from the readout lines RL1 to RLm may be sampled during a sampling period and outputted as sampled signals SM1 to SMm. The ADC 223 converts the sampled signals SM1 to SMm outputted from the sampling circuit unit 222 into sensing data SD1 to SDm in a digital form and outputs the sensing data SD1 to SDm.

Referring to FIG. 10, the first pixel PX11 is connected to the first data line DL1, the first driving scan line DSL1, the first sensing scan line SSL1, and the first readout line RL1.

The first pixel PX11 includes the light emitting element ED and the pixel driving circuit PXC. The light emitting element ED may be a light emitting diode. In an embodiment of the invention, the light emitting element ED may be an organic light emitting diode including an organic light emitting layer.

The sensing circuit 220*a* may be connected to the plurality of readout lines RL1 to RLm. The sensing circuit 220*a* may receive the sensing signals from the plurality of readout lines RL1 to RLm. The first initialization circuit unit 221*a* of the sensing circuit 220*a* may include a plurality of first initialization transistors ITa respectively connected to the plurality of readout lines RL1 to RLm. The second initialization circuit unit 221*b* of the sensing circuit 220*a* may include a plurality of second initialization transistors ITb respectively connected to the plurality of readout lines RL1 to RLm.

Although FIG. 10 illustrates first and second initialization transistors ITa and ITb connected to the first readout line RL1, the initialization circuit units 221*a* and 221*b* may further include first and second initialization transistors respectively connected to the remaining readout lines RL2 to RLm among the readout lines RL1 to RLm illustrated in FIG. 1.

The sampling circuit unit 222 illustrated in FIG. 9 may include a plurality of sampling transistors respectively connected to the plurality of readout lines RL1 to RLm. Although FIG. 10 illustrates a first sampling transistor ST1 connected to the first readout line RL1, the sampling circuit unit 222 may further include sampling transistors respectively connected to the remaining readout lines RL2 to RLm among the readout lines RL1 to RLm illustrated in FIG. 1.

The first initialization transistor ITa may include a first electrode that receives a first initialization voltage VINIT1, a second electrode connected to the first readout line RL1, and a third electrode that receives the first initialization control signal ICS1. Here, a contact point to which the first readout line RL1 and the first initialization transistor ITa are connected may be referred to as a second node N2. The first initialization transistor ITa may initialize the potential of the first readout line RL1 to the first initialization voltage VINIT1 in response to the first initialization control signal ICS1. In an embodiment of the invention, the first initialization voltage VINIT1 may have a lower voltage level than the second driving voltage ELVSS.

The second initialization transistor ITb may include a first electrode that receives a second initialization voltage VINIT2, a second electrode connected to the first readout line RL1, and a third electrode that receives the second initialization control signal ICS2. The first readout line RL1 and the second initialization transistor ITb may be connected at the second node N2. The second initialization transistor ITb may initialize the potential of the first readout line RL1 to the second initialization voltage VINIT2 in response to the second initialization control signal ICS2. In an embodiment of the invention, the second initialization voltage VINIT2 may have a lower voltage level than the second driving voltage ELVSS. In addition, the second initialization voltage VINIT2 may have a lower voltage level than the first initialization voltage VINIT1.

Figure 11:
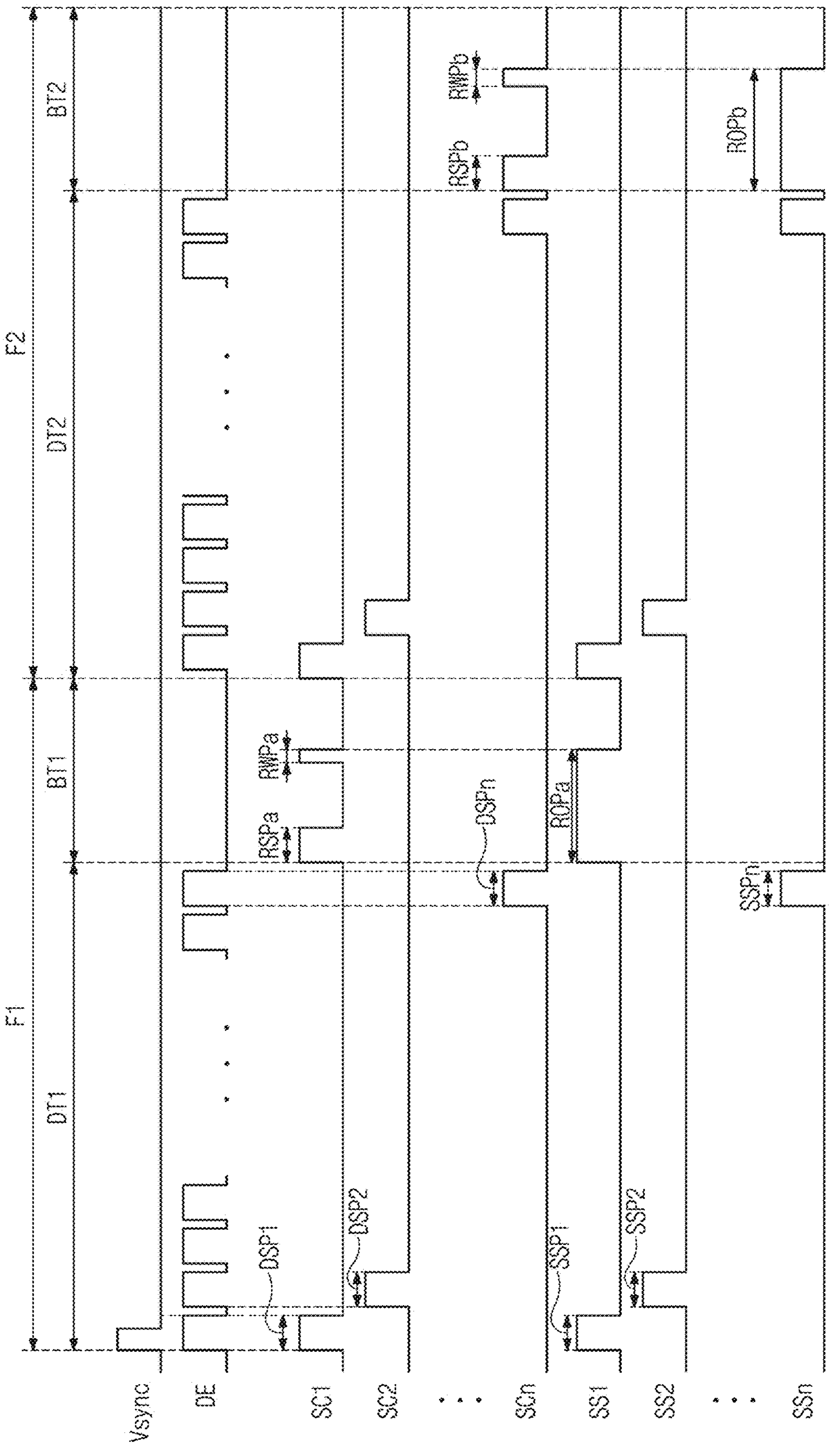
FIG. 11 is a waveform diagram for describing an operation of the pixel illustrated in FIG. 10.
Figure 12A:
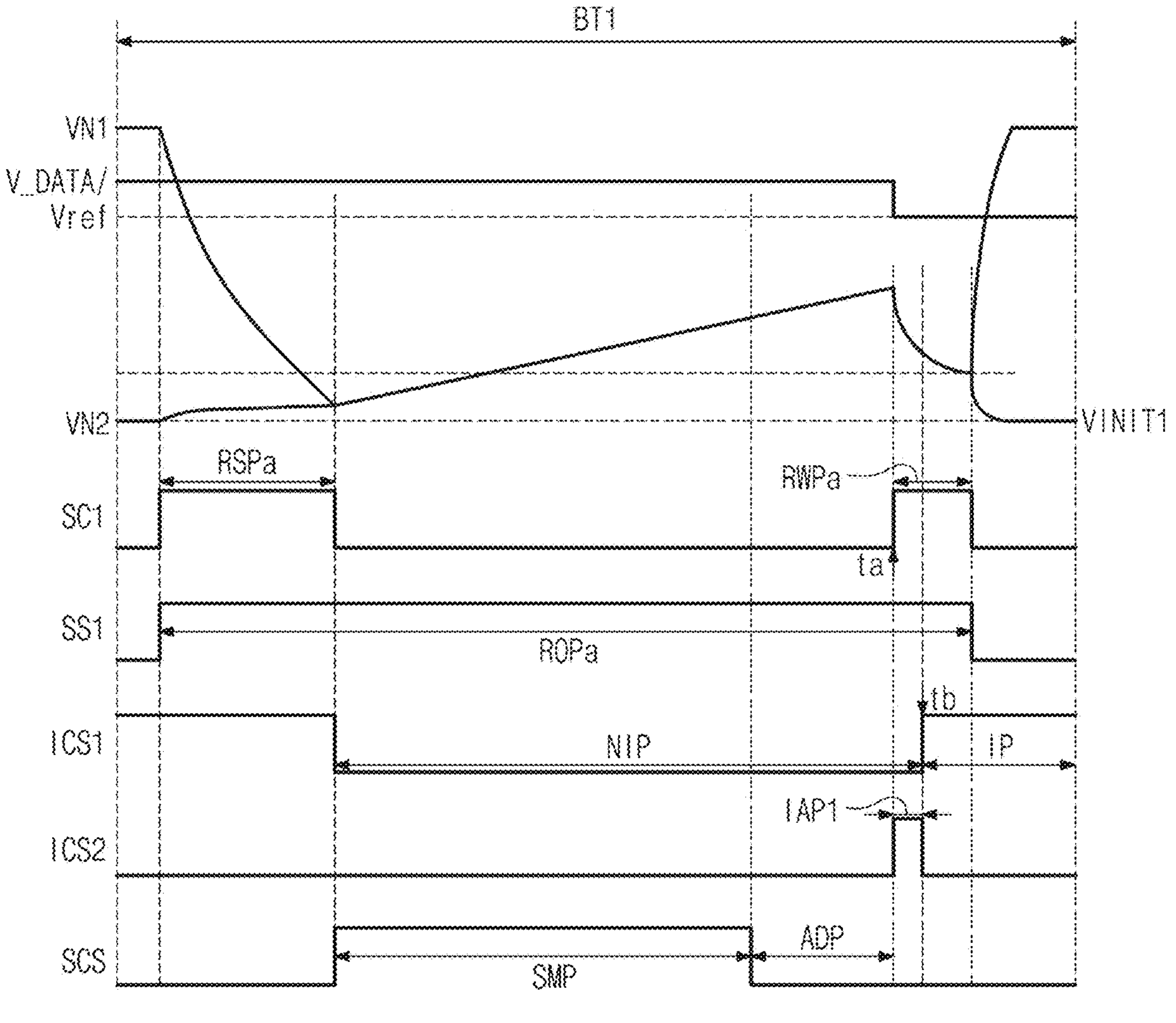
FIG. 12A is a waveform diagram for describing operations of the pixel and a sensing circuit in the first blank period illustrated in FIG. 11.
Figure 12B:
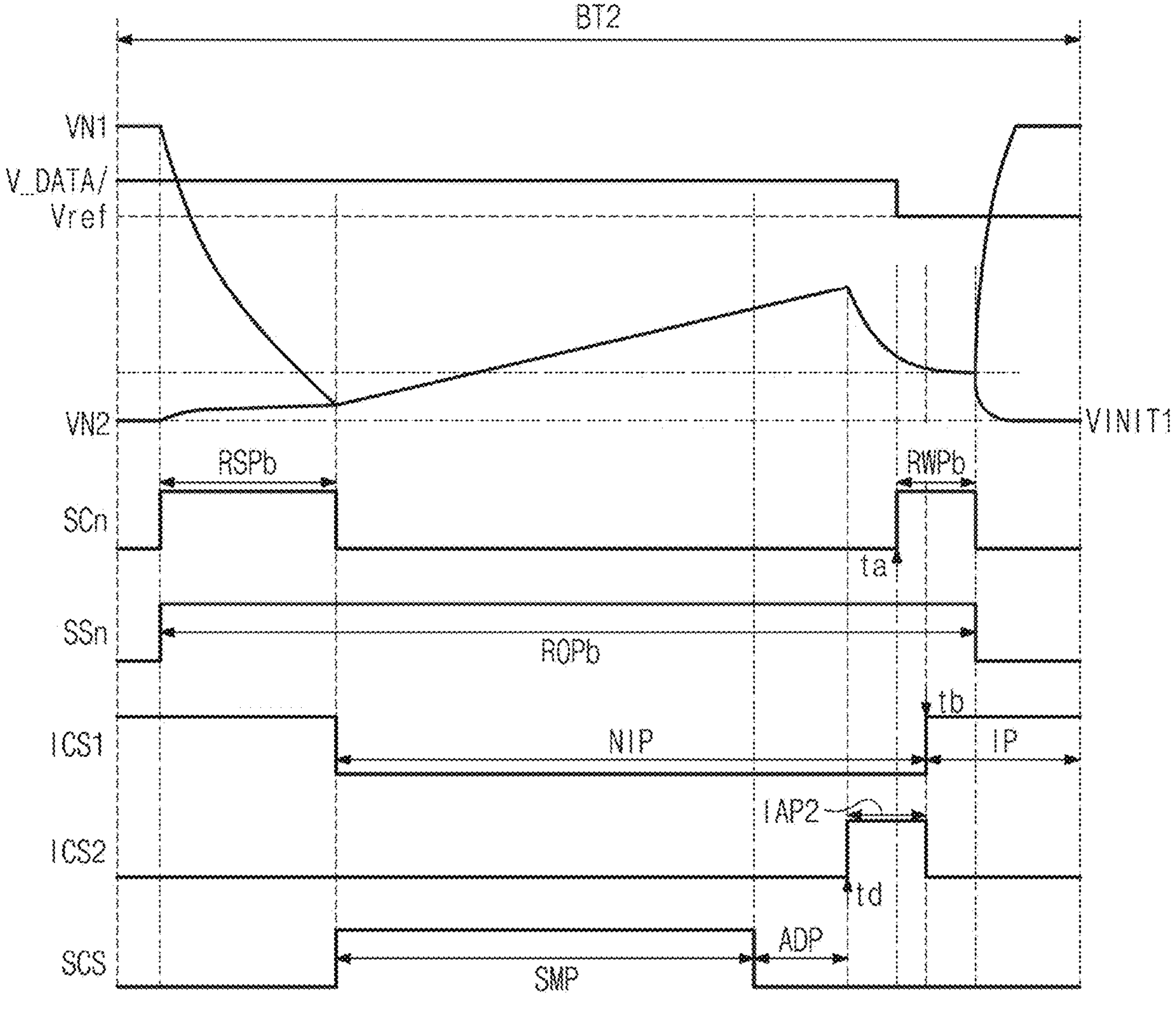
FIG. 12B is a waveform diagram for describing operations of the pixel and a sensing circuit in the second blank period illustrated in FIG. 11.

FIG. 11 is a waveform diagram for describing an operation of the pixel illustrated in FIG. 10, FIG. 12A is a waveform diagram for describing operations of the pixel and a sensing circuit in the first blank period illustrated in FIG. 11, and FIG. 12B is a waveform diagram for describing operations of the pixel and a sensing circuit in the second blank period illustrated in FIG. 11.

Referring to FIG. 11, at least one of a plurality of driving scan signals SC1 to SCn may be activated during each of the blank periods BT1 and BT2 of the frames F1 and F2. In an embodiment of the invention, a first driving scan signal SC1 among the plurality of driving scan signals SC1 to SCn may be activated during the first blank period BT1, and an n-th driving scan signal SCn among the plurality of driving scan signals SC1 to SCn may be activated during the second blank period BT2. However, an embodiment of the invention is not limited thereto. One of the remaining driving scan signals SC2 to SCn other than the first driving scan signal SC1 among the plurality of driving scan signals SC1 to SCn may be activated during the second blank period BT2.

In an embodiment, a driving scan signal activated in each of the blank periods BT1 and BT2 among the driving scan signals SC1 to SCn may include a reference scan period and a rewriting period. In an embodiment of the invention, the first driving scan signal SC1 activated in the first blank period BT1 may include a first reference scan period RSPa and a first rewriting period RWPa, and the n-th driving scan signal SCn activated in the second blank period BT2 may include a second reference scan period RSPb and a second rewriting period RWPb.

The first reference scan period RSPa may have a same duration as the second reference scan period RSPb. In addition, the first reference scan period RSPa may have a same duration as the first driving scan period DSP1. However, an embodiment of the invention is not limited thereto. Alternatively, the first reference scan period RSPa and the first driving scan period DSP1 may have different durations from each other. In an embodiment, for example, the first reference scan period RSPa may have a shorter duration than the first driving scan period DSP1.

The first rewriting period RWPa may have a shorter duration than the first reference scan period RSPa. The first rewriting period RWPa and the second rewriting period RWPb may have a same duration as each other.

At least one of a plurality of sensing scan signals SS1 to SSn may be activated during each of the blank periods BT1 and BT2 of the frames F1 and F2. In an embodiment of the invention, a first sensing scan signal SS1 among the plurality of sensing scan signals SS1 to SSn may be activated during the first blank period BT1, and an n-th sensing scan signal SSn among the plurality of sensing scan signals SS1 to SSn may be activated during the second blank period BT2. However, an embodiment of the invention is not limited thereto. One of the remaining sensing scan signals SS2 to SSn other than the first sensing scan signal SS1 among the plurality of sensing scan signals SS1 to SSn may be activated during the second blank period BT2.

In an embodiment, a sensing scan signal activated in each of the blank periods BT1 and BT2 among the sensing scan signals SS1 to SSn may include a readout period. In an embodiment of the invention, the first sensing scan signal SS1 activated in the first blank period BT1 may include a first readout period ROPa, and the n-th sensing scan signal SSn activated in the second blank period BT2 may include a second readout period ROPb. The first readout period ROPa may have a same duration as the second readout period ROPb.

Referring to FIG. 10 and FIG. 12A, the first driving scan signal SC1 may be activated to a high level during the first reference scan period RSPa of the first blank period BT1. When the first driving scan signal SC1 of the high level is provided through the first driving scan line DSL1 during the first reference scan period RSPa, the second transistor T2 is turned on in response to the first driving scan signal SC1.

In such an embodiment, the reference data signal Vref is provided to the first data line DL1 during the first reference scan period RSPa of the first blank period BT1. The reference data signal Vref may be provided to the first transistor T1 through the turned-on second transistor T2. In an embodiment of the invention, the level of the reference data signal Vref may be about 5 V but is not particularly limited. The reference data signal Vref is defined as a signal applied to the first data line DL1 for sensing in the first blank period BT1, and the data signal V_DATA is defined as a signal applied to the first data line DL1 for light emission in the first display period DT1. In an embodiment of the invention, while the reference data signal Vref does not affect the light emission of the light emitting element ED, the driving current Id of the light emitting element ED may be determined by the data signal V_DATA in the first display period DT1.

In an embodiment of the invention, during the first reference scan period RSPa of the first blank period BT1, the first readout line RL1 may have a state of being initialized to the first initialization voltage VINIT1. In such an embodiment, when the first initialization transistor ITa is turned on in response to the first initialization control signal ICS1, the first initialization voltage VINIT1 may be applied to the first readout line RL1. In an activation period of the first initialization control signal ICS1 (i.e., a first initialization period IP), the first readout line RL1 may be initialized to the first initialization voltage VINIT1, and in a deactivation period of the first initialization control signal ICS1 (i.e., a first non-initialization period NIP), the first initialization voltage VINIT1 may not be applied to the first readout line RL1.

The first sensing scan signal SS1 may be activated to a high level during the first readout period ROPa of the first blank period BT1. When the first sensing scan signal SS1 of the high level is provided through the first sensing scan line SSL1 during the first readout period ROPa, the third transistor T3 is turned on in response to the first sensing scan signal SS1. The first initialization voltage VINIT1 supplied to the first readout line RL1 is supplied to the first node N1.

In an embodiment of the invention, the first readout period ROPa and the first reference scan period RSPa may partially overlap each other. In such an embodiment, the reference data signal Vref and the first initialization voltage VINIT1 may be respectively applied to both ends of the capacitor Cst in the overlapping period, and an electric charge corresponding to a voltage difference Vref−VINIT1 between the both ends may be stored in the capacitor Cst.

The second driving voltage ELVSS is applied to the cathode of the light emitting element ED. Accordingly, when the first initialization voltage VINIT1 having a voltage level lower than that of the second driving voltage ELVSS is applied to the first node N1, no current flows in the light emitting element ED.

After the first reference scan period RSPa ends, the sampling control signal SCS may be activated, and the first initialization control signal ICS1 may be deactivated. An activation period of the sampling control signal SCS may be defined as a sampling period SMP. During the sampling period SMP, the sampling circuit unit 222 may receive the sensing signal through the first readout line RL1. The first sensing scan signal SS1 may be activated at least during the sampling period SMP. That is, the sampling period SMP and the first readout period ROPa may overlap each other.

When the first initialization control signal ICS1 is deactivated after the first reference scan period RSPa ends, the first initialization voltage VINIT1 may not be applied to the second node N2. Then, the potentials VN1 and VN2 of the first and second nodes N1 and N2 may gradually increase.

The first rewriting period RWPa may start after the sampling period SMP ends. That is, the first rewriting period RWPa may start at a time point (i.e., a first time point ta) that is delayed by a predetermined time from a time point at which the sampling period SMP ends. When the first rewriting period RWPa starts, the data signal V_DATA instead of the reference data signal Vref may be applied again to the first data line DL1. Accordingly, the rise of the potentials VN1 and VN2 of the first and second nodes N1 and N2 may slow or stop at the first time point ta.

In an embodiment of the invention, the second initialization control signal ICS2 may be activated at the first time point ta. That is, an activation period of the second initialization control signal ICS2 (i.e., a second initialization period IAP1) may overlap the first rewriting period RWPa.

When the second initialization transistor ITb is turned on in response to the second initialization control signal ICS2, the second initialization voltage VINIT2 may be applied to the first readout line RL1. Because the second initialization voltage VINIT2 is lower than the first initialization voltage VINIT1, the potentials VN1 and VN2 of the first and second nodes N1 and N2 may be rapidly discharged in the second initialization period IAP1.

Thereafter, at a second time point tb, the first initialization control signal ICS1 may be activated, and the second initialization control signal ICS2 may be deactivated. Then, the potentials VN1 and VN2 of the first and second nodes N1 and N2 may be lowered by the first initialization voltage VINIT1.

A waiting period ADP may be defined between the time point at which the sampling period SMP ends and the first time point ta at which the second initialization control signal ICS2 is activated. The waiting period ADP may be a period set to secure time for the ADC 223 to effectively process the sampled signals. As the waiting period ADP is secured as described above, noise may be effectively prevented from being introduced into the ADC 223 while the ADC 223 processes the sampled signals.

In an embodiment, as described above, after performing a first initialization process of preemptively lowering the potential VN1 of the first node N1 to the second initialization voltage VINIT2 through the second initialization circuit unit 221*b*, a second initialization process of lowering the potential VN1 of the first node N1 to the first initialization voltage VINIT1 may be performed. Accordingly, dark lines, bright lines, etc. may be effectively prevented being viewed, which occurs when the potential VN1 of the first node N1 is not sufficiently initialized.

Referring to FIG. 10 and FIG. 12B, the n-th driving scan signal SCn may be activated to the high level during the second reference scan period RSPb of the second blank period BT2. When the n-th driving scan signal SCn of the high level is provided through the n-th driving scan line DSLn during the second reference scan period RSPb, the second transistor T2 is turned on in response to the n-th driving scan signal SCn.

In such an embodiment, the reference data signal Vref is provided to the first data line DL1 during the second reference scan period RSPb of the second blank period BT2. The reference data signal Vref may be provided to the first transistor T1 through the turned-on second transistor T2.

In an embodiment of the invention, during the second reference scan period RSPb of the second blank period BT2, the first readout line RL1 may have a state of being initialized to the first initialization voltage VINIT1.

The n-th sensing scan signal SSn may be activated to the high level during the second readout period ROPb of the second blank period BT2. When the n-th sensing scan signal SSn of the high level is provided through the n-th sensing scan line SSLn during the second readout period ROPb, the third transistor T3 is turned on in response to the n-th sensing scan signal SSn. The first initialization voltage VINIT1 supplied to the first readout line RL1 is supplied to the first node N1.

In an embodiment of the invention, the second readout period ROPb and the second reference scan period RSPb may partially overlap each other. In such an embodiment, the reference data signal Vref and the first initialization voltage VINIT1 may be respectively applied to both ends of the capacitor Cst in the overlapping period, and an electric charge corresponding to the voltage difference Vref−VINIT1 between the both ends may be stored in the capacitor Cst. The reference data signal Vref is defined as a signal applied to the first data line DL1 for sensing in the second blank period BT2, and the data signal V_DATA is defined as a signal applied to the first data line DL1 for light emission in the second display period DT2. In an embodiment of the invention, while the reference data signal Vref does not affect the light emission of the light emitting element ED, the driving current Id of the light emitting element ED may be determined by the data signal V_DATA in the second display period DT2.

The second driving voltage ELVSS is applied to the cathode of the light emitting element ED. Accordingly, when the first initialization voltage VINIT1 having a voltage level lower than that of the second driving voltage ELVSS is applied to the first node N1, no current flows in the light emitting element ED.

After the second reference scan period RSPb ends, the sampling control signal SCS may be activated, and the first initialization control signal ICS1 may be deactivated. The activation period of the sampling control signal SCS may be defined as the sampling period SMP. During the sampling period SMP, the sampling circuit unit 222 may receive the sensing signal through the first readout line RL1. The n-th sensing scan signal SSn may be activated at least during the sampling period SMP. That is, the sampling period SMP and the second readout period ROPb may overlap each other.

When the first initialization control signal ICS1 is deactivated after the second reference scan period RSPb ends, the first initialization voltage VINIT1 may not be applied to the second node N2. Then, the potentials VN1 and VN2 of the first and second nodes N1 and N2 may gradually increase.

After the sampling period SMP ends, the second rewriting period RWPb may start. That is, the second rewriting period RWPb may start at a time point (i.e., the first time point ta) that is delayed by a predetermined time from a time point at which the sampling period SMP ends. When the second rewriting period RWPb starts, the data signal V_DATA instead of the reference data signal Vref may be applied again to the first data line DL1. Accordingly, the rise of the potentials VN1 and VN2 of the first and second nodes N1 and N2 may slow or stop at the first time point ta.

In an embodiment of the invention, the second initialization control signal ICS2 may be activated at a third time point td. That is, the activation period of the second initialization control signal ICS2 (i.e., a third initialization period IAP2) may overlap the second rewriting period RWPb.

A waiting period ADP may be defined between the time point at which the sampling period SMP ends and the third time point td at which the second initialization control signal ICS2 is activated. The waiting period ADP may be a period set to secure time for the ADC 223 to effectively process the sampled signals. As the waiting period ADP is secured as described above, noise may be effectively prevented from being introduced into the ADC 223 while the ADC 223 processes the sampled signals.

When the second initialization transistor ITb is turned on in response to the second initialization control signal ICS2, the second initialization voltage VINIT2 may be applied to the first readout line RL1. Because the second initialization voltage VINIT2 is lower than the first initialization voltage VINIT1, the potentials VN1 and VN2 of the first and second nodes N1 and N2 may be rapidly discharged in the third initialization period IAP2.

Here, the duration of the third initialization period IAP2 may be longer than the duration of the second initialization period IAP1. Accordingly, dark lines, bright lines, etc. may be effectively prevented from being viewed, which occurs when the potential VN1 of the first node N1 of each of pixels connected to the n-th driving scan line DSLn, which is relatively far from the sensing circuit 220*a*, is not sufficiently initialized.

In such an embodiment, a luminance difference may be improved between pixels connected to the first driving scan line DSL1 and the pixels connected to the n-th driving scan line DSLn.

Thereafter, at the second time point tb, the first initialization control signal ICS1 may be activated, and the second initialization control signal ICS2 may be deactivated. Then, the potentials VN1 and VN2 of the first and second nodes N1 and N2 may be lowered by the first initialization voltage VINIT1.

According to an embodiment of the invention, when the characteristics of the pixel are sensed through the sensing circuit, dark lines or bright lines may be effectively prevented from being viewed on the display panel by securing sufficient time for discharging the potential of the first node of the pixel.

In such an embodiment, dark lines and bright lines which may occur due to the difference in the amount of discharge in the first node due to the distance between the sensing circuit and the pixels may be effectively prevented from being viewed on the display panel.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
a display panel including a plurality of scan lines, a plurality of pixels, and a plurality of readout lines;
a scan driver connected to the plurality of scan lines; and
a sensing circuit connected to the plurality of readout lines,
wherein each of the plurality of pixels comprises:
a light emitting element; and
a pixel circuit connected to the light emitting element at a first node,
wherein the pixel circuit drives the light emitting element in response to a corresponding driving scan signal among a plurality of driving scan signals during a display period, wherein the pixel circuit is connected to a corresponding readout line among the plurality of readout lines at a second node, the sensing circuit senses a potential of the first node through the corresponding readout line during a blank period, each of a plurality of frames comprises the display period and the blank period, the plurality of driving scan signals respectively comprise a plurality of rewriting periods, at least one rewriting period of at least one driving scan signal among the plurality of driving scan signals is activated during the blank period, and the plurality of rewriting periods have different durations from each other, wherein the sensing circuit comprises:

an initialization circuit unit which initializes a potential of the second node during an initialization period in response to an initialization control signal, wherein a time point at which each of the rewriting periods starts precedes a time point at which the initialization period corresponding thereto starts.

2. The display device of claim 1, wherein the plurality of scan lines comprise:

a first driving scan line spaced apart from the sensing circuit by a first distance; and a second driving scan line spaced apart from the sensing circuit by a second distance, wherein a second rewriting period of a second driving scan signal applied to the second driving scan line has a duration different from a duration of a first rewriting period of a first driving scan signal applied to the first driving scan line.

3. The display device of claim 2, wherein the second distance is longer than the first distance, and the second rewriting period has a duration longer than a duration of the first rewriting period.

4. The display device of claim 1, wherein the sensing circuit further comprises:

a sampling circuit unit which samples the potential of the first node during a sampling period in response to a sampling control signal.

5. The display device of claim 4, wherein each of the plurality of rewriting periods does not overlap the sampling period corresponding thereto.

6. The display device of claim 4, wherein the blank period further comprises a reference scan period preceding the sampling period corresponding thereto, wherein the at least one driving scan signal is activated during the reference scan period corresponding thereto.

7. The display device of claim 6, wherein each of the plurality of rewriting periods has a duration longer than a duration of the reference scan period corresponding thereto.

8. The display device of claim 4, wherein the initialization control signal is deactivated during the sampling period.

9. The display device of claim 4, wherein the pixel circuit receives a corresponding sensing scan signal among a plurality of sensing scan signals, at least one sensing scan signal among the plurality of sensing scan signals are activated in the blank period, and the at least one sensing scan signal among the plurality of sensing scan signals are applied to same pixels as the at least one driving scan signal.

10. The display device of claim 9, wherein the at least one sensing scan signal comprise a readout period is activated during the sampling period and a corresponding one of the plurality of rewriting periods.

11. The display device of claim 10, wherein a plurality of readout periods of the plurality of sensing scan signals have different durations from each other.

12. The display device of claim 11, wherein the plurality of scan lines comprise:

a first sensing scan line spaced apart from the sensing circuit by a third distance; and a second sensing scan line spaced apart from the sensing circuit by a fourth distance, wherein a second readout period of a second sensing scan signal applied to the second sensing scan line has a duration different from a duration of a first readout period of a first sensing scan signal applied to the first sensing scan line.

13. The display device of claim 12, wherein the fourth distance is longer than the third distance, and the second readout period has a duration longer than a duration of the first readout period.

14. The display device of claim 4, wherein the display panel further comprises a plurality of data lines, wherein the pixel circuit comprises:

a first transistor connected between a first driving voltage line and the first node;

a second transistor connected between a corresponding data line among the plurality of data lines and the first transistor, wherein the second transistor receives the corresponding driving scan signal; and a capacitor connected between the first node and the first transistor.

15. The display device of claim 14, wherein the light emitting element comprises a light emitting diode connected between the first node and a second driving voltage line.

16. The display device of claim 14, wherein the pixel circuit further comprises a third transistor connected between the first node and the corresponding readout line, wherein the third transistor receives a corresponding sensing scan signal among a plurality of sensing scan signals.

17. The display device of claim 14, further comprising:

a data driver connected to the plurality of data lines, wherein the blank period further comprises a reference scan period preceding the sampling period.

18. The display device of claim 17, wherein the data driver respectively applies a plurality of data signals to the plurality of data lines during the display period, and applies a reference data signal to a corresponding data line, among the plurality of data lines, connected to a same pixel as a corresponding scan line, during the reference scan period.

19. The display device of claim 18, wherein the data driver applies a corresponding data signal among the plurality of data signals to the corresponding data line during a corresponding one of the plurality of rewriting periods.

* * * * *